(12) United States Patent
Takada et al.

(10) Patent No.: US 12,472,033 B2
(45) Date of Patent: Nov. 18, 2025

(54) BIOMAGNETIC FIELD MEASUREMENT DEVICE, BIOMAGNETIC FIELD MEASUREMENT SYSTEM, AND BIOMAGNETIC FIELD MEASUREMENT METHOD

(71) Applicants: Masahiro Takada, Tokyo (JP); Shigenori Kawabata, Tokyo (JP); Akira Kinoshita, Tokyo (JP)

(72) Inventors: Masahiro Takada, Tokyo (JP); Shigenori Kawabata, Tokyo (JP); Akira Kinoshita, Tokyo (JP)

(73) Assignee: INSTITUTE OF SCIENCE TOKYO, Tokyo (JP)

( * ) Notice: Subject to any disclaimer, the term of this patent is extended or adjusted under 35 U.S.C. 154(b) by 307 days.

(21) Appl. No.: 18/366,777

(22) Filed: Aug. 8, 2023

(65) Prior Publication Data
US 2024/0050189 A1     Feb. 15, 2024

(30) Foreign Application Priority Data
Aug. 9, 2022    (JP) ................................. 2022-127380

(51) Int. Cl.
*A61B 6/00*     (2024.01)
*A61B 6/04*     (2006.01)
*A61B 90/00*    (2016.01)

(52) U.S. Cl.
CPC ............ *A61B 90/39* (2016.02); *A61B 6/0407* (2013.01); *A61B 2090/3954* (2016.02)

(58) Field of Classification Search
CPC .................................................... A61B 5/242
See application file for complete search history.

(56) References Cited

U.S. PATENT DOCUMENTS

| 2009/0002637 A1 | 1/2009 | Harada |
| 2018/0092561 A1 | 4/2018 | Kawabata et al. |
| 2018/0140215 A1 | 5/2018 | Kawabata |

(Continued)

FOREIGN PATENT DOCUMENTS

| JP | 4615519 | 1/2011 |
| JP | 2018-057843 | 4/2018 |

(Continued)

OTHER PUBLICATIONS

U.S. Appl. No. 18/167,952, filed Feb. 13, 2023.
U.S. Appl. No. 18/175,876, filed Feb. 28, 2023.

*Primary Examiner* — Dani Fox
(74) *Attorney, Agent, or Firm* — IPUSA, PLLC

(57) ABSTRACT

A biomagnetic field measurement device includes an irradiation unit configured to irradiate a subject with radiation; an imaging unit having a light-receiving surface for receiving radiation, the imaging unit being configured to image the subject based on the radiation from the irradiation unit; a marker part configured to absorb the radiation from the irradiation unit; and a processing circuit configured to output biological information based on third position information of the marker part and an imaged result of the subject by the imaging unit, the third position information of the marker part being calculated from first position information of the marker part, second position information of the irradiation unit, and a captured image of the marker part imaged by the imaging unit.

10 Claims, 28 Drawing Sheets

(56) References Cited

U.S. PATENT DOCUMENTS

| | | |
|---|---|---|
| 2019/0005660 A1 | 1/2019 | Kinoshita et al. |
| 2019/0167135 A1 | 6/2019 | Okada et al. |
| 2019/0223817 A1 | 7/2019 | Kawabata et al. |
| 2022/0031276 A1 | 2/2022 | Watanabe et al. |
| 2022/0218300 A1* | 7/2022 | Takada ................... A61B 6/589 |
| 2022/0291018 A1 | 9/2022 | Goto |

FOREIGN PATENT DOCUMENTS

| | | |
|---|---|---|
| JP | 2019-013724 | 1/2019 |
| JP | 6513798 | 5/2019 |
| JP | 2019-098156 | 6/2019 |
| JP | 2021-006243 | 1/2021 |
| JP | 2022-027432 | 2/2022 |
| JP | 7026356 | 2/2022 |
| JP | 2022-138229 | 9/2022 |

\* cited by examiner

BIOMAGNETIC FIELD MEASUREMENT DEVICE, BIOMAGNETIC FIELD MEASUREMENT SYSTEM, AND BIOMAGNETIC FIELD MEASUREMENT METHOD

CROSS-REFERENCE TO RELATED APPLICATION

The present application is based on and claims priority under 35 U.S.C. § 119 to Japanese Patent Application No. 2022-127380, filed on Aug. 9, 2022, the content of which is incorporated herein by reference in its entirety.

BACKGROUND OF THE INVENTION

1. Field of the Invention

The present disclosure discussed herein relates to a biomagnetic field measurement device, a biomagnetic field measurement system, and a biomagnetic field measurement method.

2. Description of the Related Art

There are biomagnetic field measurement devices known in the related-art, which are configured to output information about living organisms as measurement results. Examples of such biomagnetic field measurement devices include those configured to measure weak biomagnetic field caused by a weak electrical current generated by the excitation of the cells constituting the heart, the spinal cord, peripheral nerves, etc. of a subject, and those configured to output X-ray images of living organisms as measurement results.

As one example of the above-described biomagnetic field measurement devices, Patent Document 1 (Japanese Patent No. 6513798) discloses a biomagnetic field measurement device, which uses a magnetic marker that generates a magnetic field to obtain positional information of the magnetic marker in order to map the result of biomagnetic measurement with a morphological position of the organ in the subject.

RELATED ART DOCUMENT

Patent Document

[Patent document 1] Japanese Patent No. 6513798

SUMMARY OF THE INVENTION

According to an aspect of the present disclosure, a biomagnetic field measurement device includes an irradiation unit configured to irradiate a subject with radiation; an imaging unit having a light-receiving surface for receiving radiation, the imaging unit being configured to image the subject based on the radiation from the irradiation unit; a marker part configured to absorb the radiation from the irradiation unit; and a processing circuit configured to output biological information based on third position information of the marker part and an imaged result of the subject by the imaging unit, the third position information of the marker part being calculated from first position information of the marker part, second position information of the irradiation unit, and a captured image of the marker part imaged by the imaging unit.

DETAILED DESCRIPTION OF THE PREFERRED EMBODIMENTS

The biomagnetic field measurement device disclosed in Patent Document 1, however, uses the marker part such as a magnetic marker that transmits information by itself, which may allow the marker part to be installed only in the limited position.

The present disclosure is desired to provide a biomagnetic field measurement device, a biomagnetic field measurement system, and a biomagnetic field measurement method that are capable of acquiring position information of a marker part that does not transmit information by itself.

According to embodiments of the present disclosure, a biomagnetic field measurement device, a biomagnetic field measurement system, and a biomagnetic field measurement method will be described in detail with reference to the accompanying drawings. However, the following embodiments are examples of the biomagnetic field measurement device, the biomagnetic field measurement system, and the biomagnetic field measurement method that embody the technical idea of the present disclosure, and are not limited to the following examples. In addition, the dimensions, materials, shapes, and relative arrangement of the component parts described in the embodiments are not intended to limit the scope of the present disclosure to the above only and are merely illustrative examples unless otherwise specified. In the following descriptions, the same names and symbols refer to the same or similar members, and detailed descriptions are omitted as appropriate.

In each drawing, rectangular coordinates with X, Y, and Z axes are used to represent directions. The Z axis direction represents a vertical direction. The direction in which the Z axis arrow points represents the +Z direction, and the direction opposite to the +Z direction represents the −Z direction. The X and Y axis directions represent two directions perpendicular in a plane perpendicular to the Z axis. The direction in which the X axis arrow points represents the +X direction, and the direction opposite to the +X direction represents the −X direction. The direction in which the Y axis arrow points represents the +Y direction, and the direction opposite to the +Y direction represents the −Y direction. In addition, in this specification, top view means to view an object from above (+Z direction). However, these directional expressions are for convenience of explanation and do not limit the directions of the embodiments of the present disclosure.

First Embodiment

<Configuration Example of Biomagnetic Field Measurement Device 100>

Figure 1:
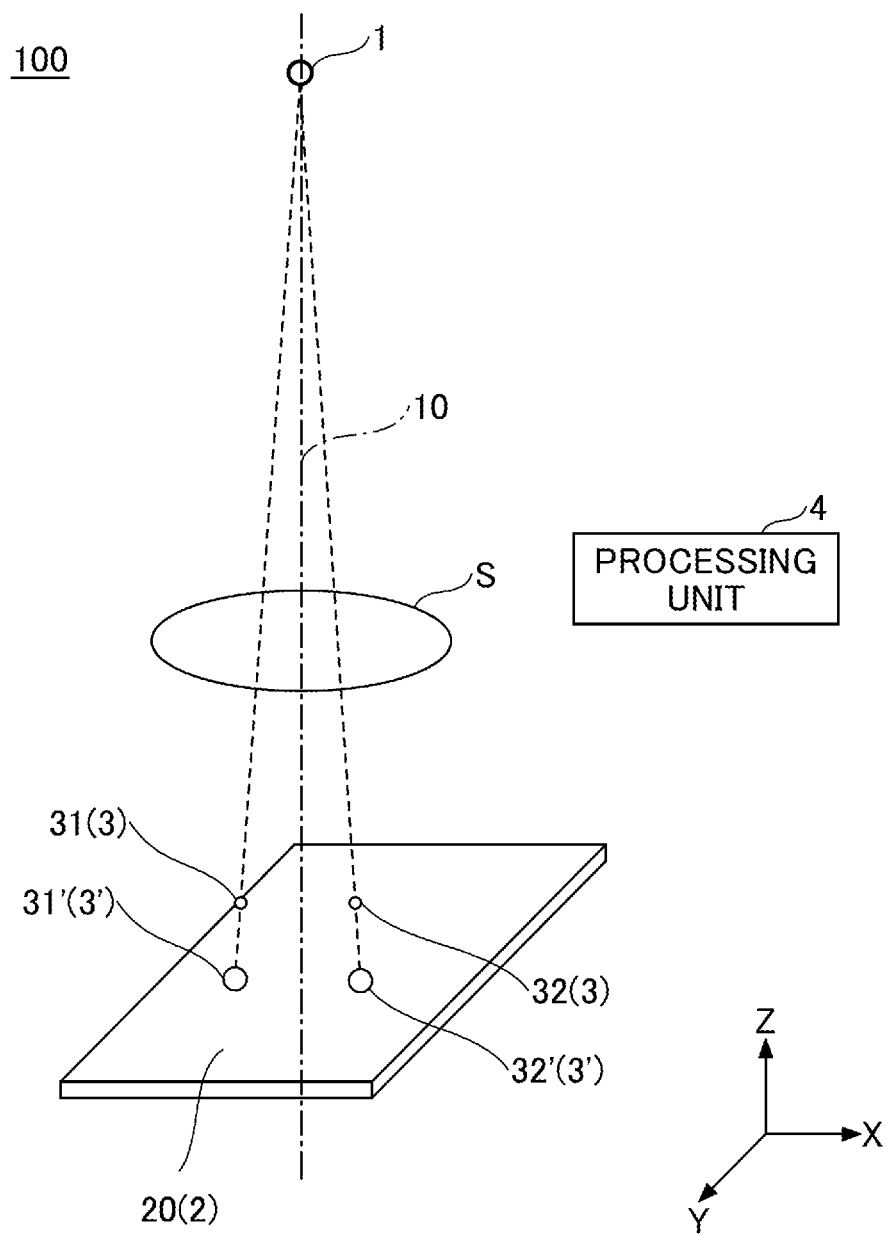
FIG. 1 is a perspective view illustrating a configuration example of a biomagnetic field measurement device according to a first embodiment.
Figure 2:
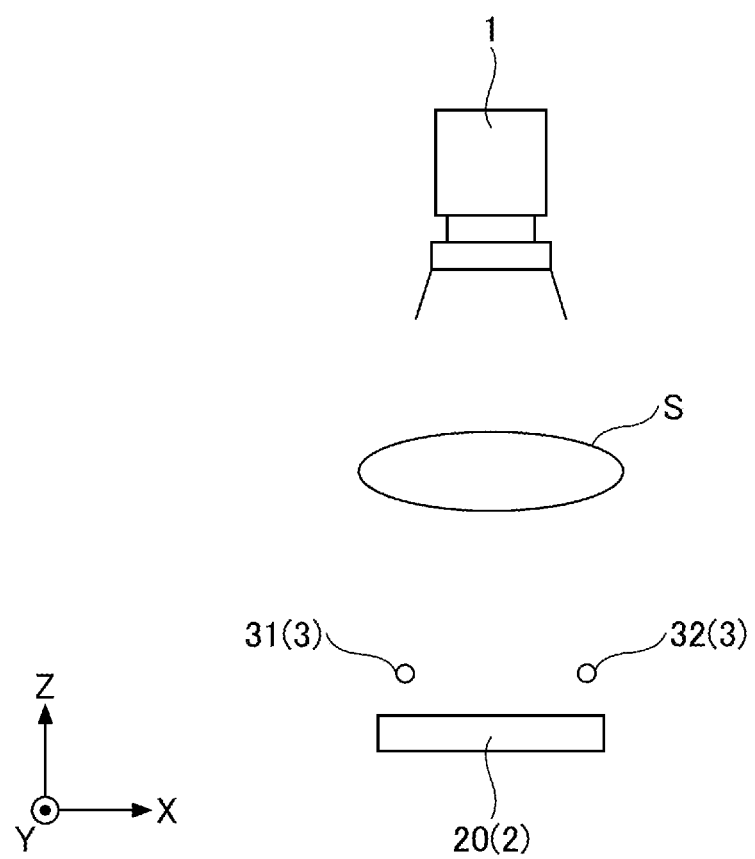
FIG. 2 is a side view illustrating the biomagnetic field measurement device of FIG. 1.
Figure 3:
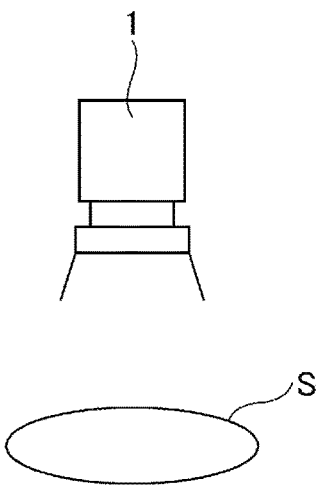
FIG. 3 is a side view illustrating the biomagnetic field measurement device as viewed from a direction perpendicular to FIG. 2.
Figure 3:
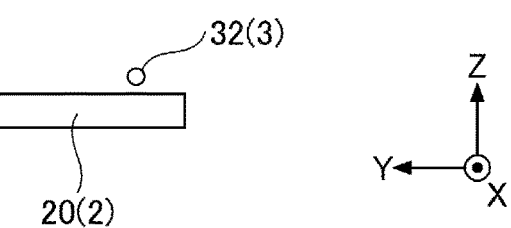
Figure 4:
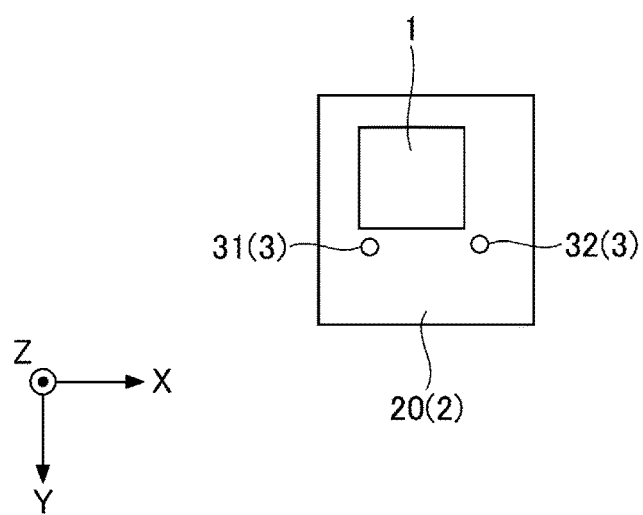
FIG. 4 is a top view illustrating the biomagnetic field measurement device of FIG. 1.

A configuration of a biomagnetic field measurement device 100 according to a first embodiment will be described with reference to FIGS. 1 to 4. FIG. 1 is a perspective view illustrating a configuration example of the biomagnetic field measurement device 100. FIG. 2 is a side view illustrating the biomagnetic field measurement device 100 as viewed from the +Y direction. FIG. 3 is a side view illustrating the biomagnetic field measurement device 100 as viewed from the +X direction. FIG. 4 is a top view illustrating the biomagnetic field measurement device 100.

As illustrated in FIGS. 1 to 4, the biomagnetic field measurement device 100 includes an irradiation unit 1, an imaging unit 2, a marker part 3, and a processing unit 4. The irradiation unit 1 irradiates a subject S with radiation. The subject S is arranged between the irradiation unit 1 and the imaging unit 2. The imaging unit 2 has a light-receiving surface 20 for receiving radiation, and is configured to image a subject S based on radiation emitted from the irradiation unit 1. The marker part 3 is arranged between the subject S and the light-receiving surface 20. The marker part 3 includes a marker part 31 and a marker part 32. Relative positions of the marker part 31 and the marker part 32 with respect to each other are known. The marker part 3 may be arranged between the subject S and the irradiation unit 1.

The biomagnetic field measurement device 100 images the subject S by the imaging unit 2 based on radiation from the irradiation unit 1. Specifically, the biomagnetic field measurement device 100 emits radiation by the irradiation unit 1 from above the subject S and receives the radiation by the light-receiving surface 20 arranged opposite to the irradiation unit 1 across the subject S to image the subject S. The radiation emitted by the irradiation unit 1 is, for example, X-rays. The imaging by the imaging unit 2 is, for example, X-ray imaging. The processing unit 4 outputs an X-ray image of the subject S as biological information based on an imaged result by the imaging unit 2.

The marker part 3 is used to associate the distance on the image (e.g., the units are pixels) and the distance in the real space (e.g., the units are mm) of an organ or the like on the X-ray image by the imaging unit 2. By associating the two distances, the biomagnetic field measurement device 100 can calibrate the association between the distance on the image and the distance in the real space. When this calibration is performed, it is sufficient to calculate the position of the marker part 3. Thus, if there is a marker part 3 between the irradiation unit 1 and the imaging unit 2, the subject S may be present or absent.

The marker part 31 and the marker part 32 may be aligned in a direction intersecting the normal to the light-receiving surface 20. For example, when the marker part 31 and the marker part 32 are aligned in the direction normal to the light-receiving surface 20, the images of the marker part 31 and the marker part 32 by the imaging unit 2 are obtained superimposed, so that it becomes difficult to associate the distance on the image with the distance in the real space based on the distance between the images of the marker part 31 and the marker part 32. Since the images of the marker part 31 and the marker part 32 by the imaging unit 2 can be obtained separately by aligning the marker part 31 and the marker part 32 in the direction intersecting the normal to the light-receiving surface 20, the distance on the image can be associated with the distance in the real space based on the distance between the images of the marker part 31 and the marker part 32.

The processing unit 4 is actualized by a computer or the like. There is no particular restriction on the position at which the processing unit 4 is arranged, and the position at which the processing unit 4 is arranged can be selected as appropriate. The processing unit 4 outputs biological information based on third position information of the marker part 3 and an imaged result by the imaging unit 2, where the third position information of the marker part 3 is acquired from first position information of the marker part 3, second position information of the irradiation unit 1, and a captured image of the marker part 3 acquired by the imaging unit 2. The first position information of the marker part 3 corresponds to known relative position information of the marker part 31 and the marker part 32. The third position information means information related to the position of the marker part 3 in a predetermined coordinate system.

The irradiation unit 1 irradiates the subject S with radiation from above the subject S. The central axis 10 in FIG. 1 represents the central axis of the radiation from the irradiation unit 1. According to the present embodiment, an inclination of the light-receiving surface 20 with respect to the central axis 10 is approximately 90 degrees. However, the inclination of the light-receiving surface 20 with respect to the central axis 10 is not limited to approximately 90 degrees and may be at any angle. The radiation from the irradiation unit 1 is preferably a simple X-ray. According to the present embodiment, the irradiation unit 1 is an X-ray light source capable of emitting a simple X-ray.

The imaging unit 2 is arranged below the subject S. In other words, the imaging unit 2 is arranged opposite to the irradiation unit 1 across the subject S. The imaging unit 2 acquires the captured image of the subject S based on the radiation transmitted through the subject S. The captured image is digital image data. The imaging unit 2 outputs information about the captured image to the processing unit 4.

A flat panel detector (hereinafter referred to as FPD) or an imaging plate (hereinafter referred to as IP) can be used for the imaging unit 2. FPD conversion methods include a direct conversion method, an indirect method, etc. The direct conversion method includes generating, by the light-receiving surface 20 as a detection element, electric charge according to the dose of radiation received, and converting the generated electric charge into an electrical signal. The indirect method includes converting, by the light-receiving surface 20 of a scintillator, received radiation into electromagnetic waves of other wavelengths, such as visible light, generating electric charge by a photoelectric conversion element, such as a photodiode, according to the energy of the converted irradiated electromagnetic waves, and converting the generated electric charge into an electrical signal.

In the IP above, a film coated with a photostimulable phosphor powder is housed as the light-receiving surface 20 in a casing called a cassette. The radiation transmitted through a test site U of the subject S is applied to the IP, and the energy of the radiation is stored in the photostimulable phosphor. Then, by the reader, the IP is irradiated with laser light of a specific wavelength, and either the amount of reflected light or the amount of transmitted light of the irradiated laser light by the IP is read to acquire the captured image.

The marker part 31 and the marker part 32 in the marker part 3 are arranged between the subject S and the light-receiving surface 20. The marker part 31 and the marker part 32 each absorb radiation from the irradiation unit 1. As the marker part 31 and the marker part 32 absorb radiation, shadows of the marker part 31 and the marker part 32 are included as a marker part image 31' and a marker part image 32', respectively, in the captured image by the imaging unit 2.

For example, each of the marker part 31 and the marker part 32 containing iron can absorb radiation. However, the marker part 31 and the marker part 32 may contain tungsten. Each of the marker part 31 and the marker part 32 is a sphere. The biomagnetic field measurement device 100 can efficiently and accurately detect the positions of the marker part 31 and the marker part 32 by detecting the center position of the sphere.

<Modification of a Marker Part According to the First Embodiment>

Figure 5:
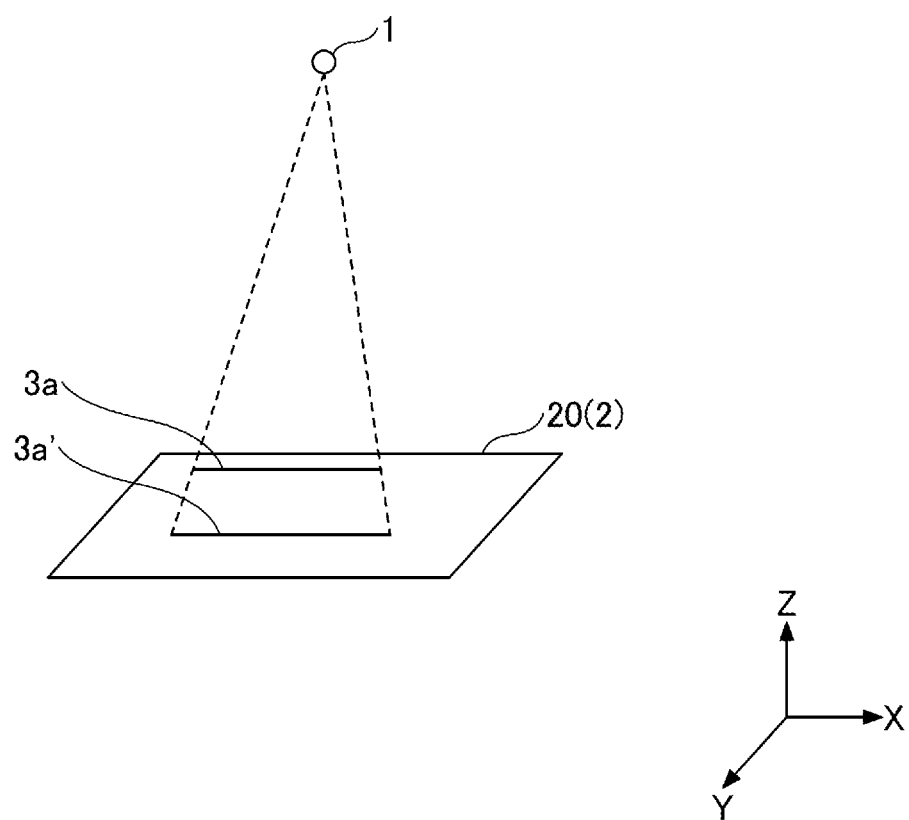
FIG. 5 is a perspective view illustrating a configuration of marker parts according to a first modification of the first embodiment.
Figure 6:
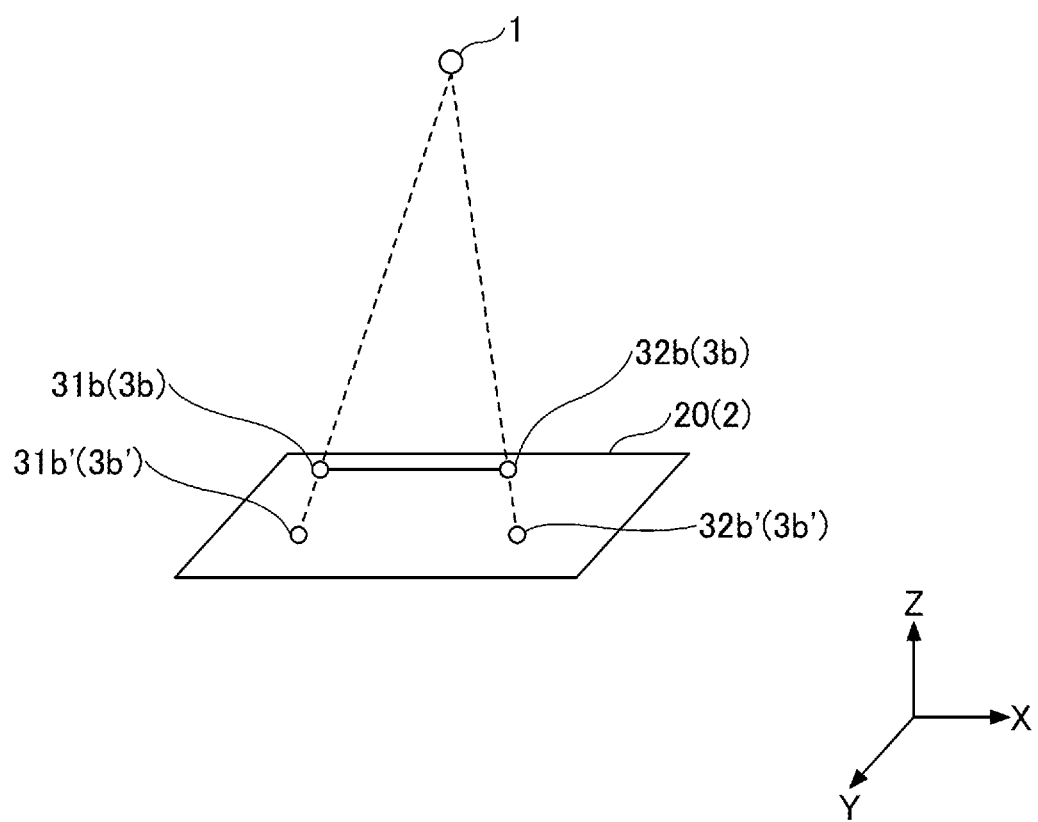
FIG. 6 is a perspective view illustrating a configuration of marker parts according to a second modification of the first embodiment.
Figure 7:
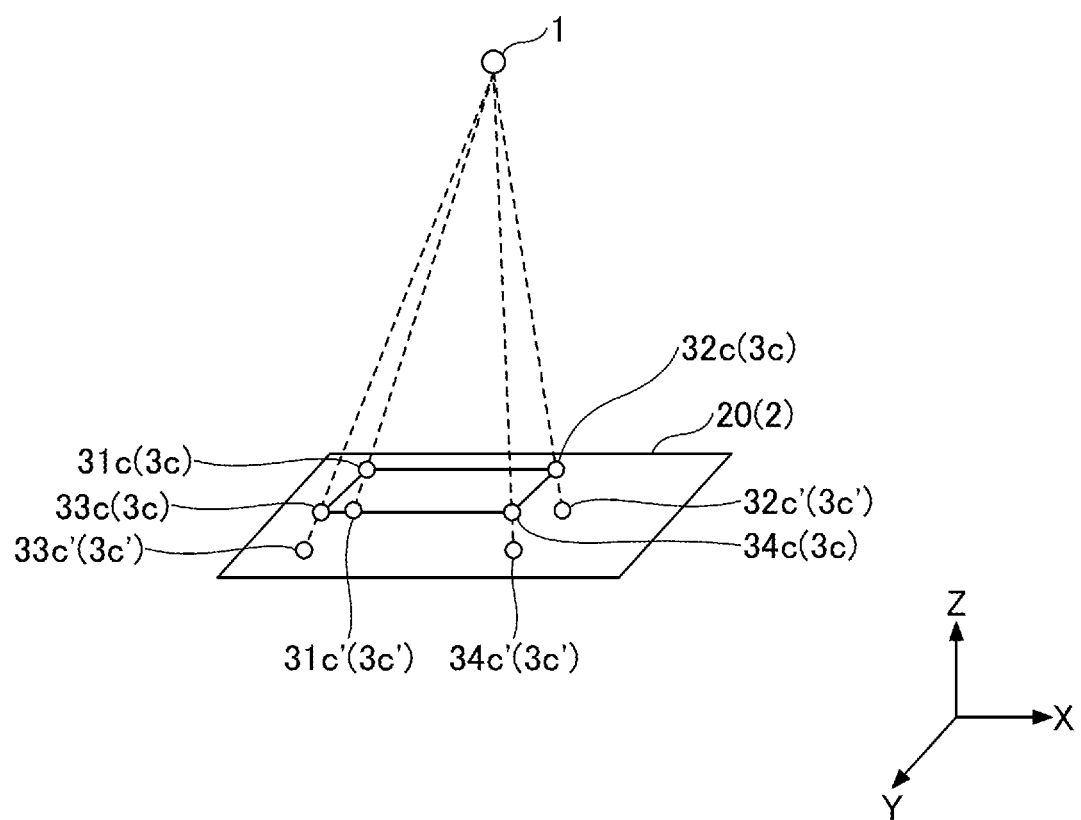
FIG. 7 is a perspective view illustrating a configuration of marker parts according to a third modification of the first embodiment.
Figure 8:
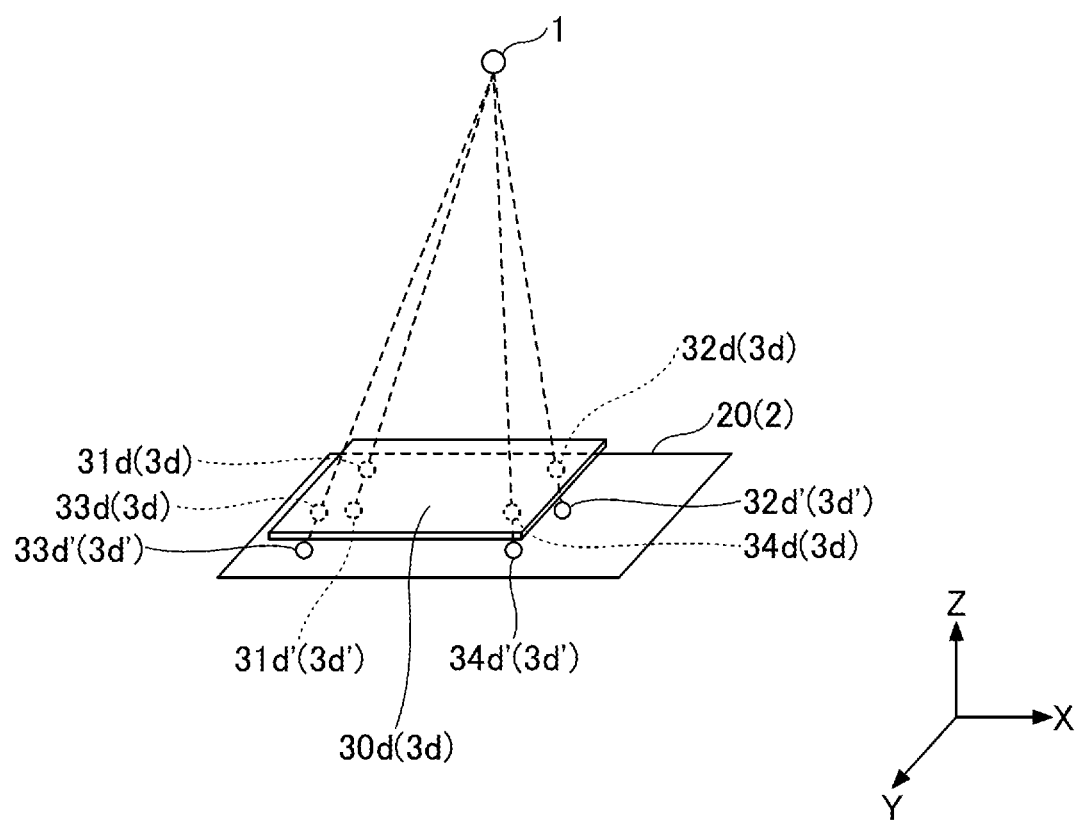
FIG. 8 is a perspective view illustrating a configuration of marker parts according to a fourth modification of the first embodiment.

The marker part according to the first embodiment can be modified in various ways. FIGS. 5 to 8 are perspective views illustrating a configuration of a marker part according to a modification of the first embodiment. FIG. 5 illustrates a first modification, FIG. 6 illustrates a second modification, FIG. 7 illustrates a third modification, and FIG. 8 illustrates a fourth modification.

In FIG. 5, a marker part 3a has a linear shape with the length in the X-axis direction. Unlike the marker part 3 described above, the marker part 3a is one member. The relative positions of both ends of the marker part 3a in the X-axis direction are known, which correspond to the first position information described above. Iron or tungsten can be used as a material of the marker part 3a. A marker part image 3a' is an image of the marker part 3a.

In FIG. 6, a marker part 3b has a linear shape with the length in the X-axis direction, and has a marker part 31b at one end in the X-axis direction and a marker part 32b at the other end in the X-axis direction. The marker part 31b and the marker part 32b are each spherical. Iron or tungsten can be used for a material of each of the marker part 31b and the marker part 32b. A marker part image 31b' is an image of the marker part 3b. A marker part image 32b' is an image of the marker part 3b. The relative positions of the marker part 31b and the marker part 32b with respect to each other are known, and correspond to the first position information described above. A portion having a linear shape in the marker part 3b preferably contains a non-magnetic material. The marker part 31b and the marker part 32b are not limited to spheres, and may be solids having shapes other than spheres.

In FIG. 7, a marker part 3c includes a marker part 31c, a marker part 32c, a marker part 33c, and a marker part 34c. The marker part 31c, the marker part 32c, the marker part 33c, and the marker part 34c are arranged in a virtual plane along the light-receiving surface 20 in a range that can be captured by the imaging unit 2. Iron or tungsten can be used for a material of each of the marker part 31c, the marker part 32c, the marker part 33c, and the marker part 34c.

A marker part image 31c' is an image of the marker part 31c. A marker part image 32c' is an image of the marker part 32c. A marker part image 33c' is an image of the marker part 33c. A marker part image 34c' is an image of the marker part 34c. The number of marker parts included in the marker part 3c is not limited to four, but may be three, or five or more. Relative positions of the marker part 31c, the marker part 32c, the marker part 33c, and the marker part 34c are known to each other, and correspond to the above first position information.

In FIG. 8, a marker part 3d includes a flat plate member 30d, a marker part 31d, a marker part 32d, a marker part 33d, and a marker part 34d. The marker part 31d, the marker part 32d, the marker part 33d, and the marker part 34d are provided inside or outside the flat plate member 30d so as to be integrated with the flat plate member 30d. Iron or tungsten can be used as a material for the marker part 31d, the marker part 32d, the marker part 33d, and the marker part

34*d*. Relative positions of the marker part 31*d*, the marker part 32*d*, the marker part 33*d*, and the marker part 34*d* are known to each other, and correspond to the above first position information. The flat plate member 30*d* is preferably non-magnetic.

A marker part image 31*d'* is an image of the marker part 31*d*. A marker part image 32*d'* is an image of the marker part 32*d*. A marker part image 33*d'* is an image of the marker part 33*d*. A marker part image 34*d'* is an image of the marker part 34*d*. The number of marker parts integrally provided for the flat plate member 30*d* is not limited to four, but may be three, or five or more.

According to the present embodiment, the marker parts 3*a* to 3*d* are all arranged below the irradiation unit 1.

<Configuration Example of the Processing Unit 4>
(Hardware Configuration)

Figure 9:
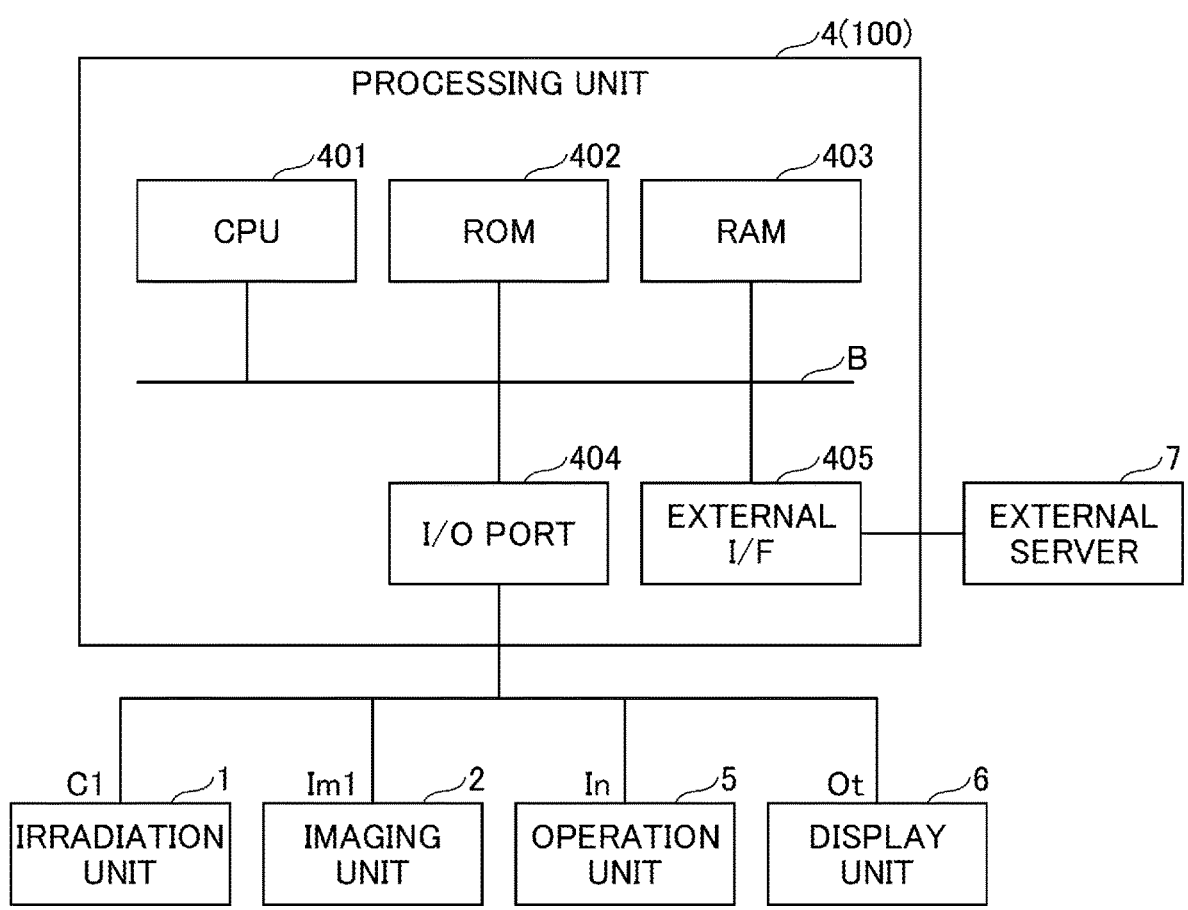
FIG. 9 is a block diagram illustrating an example of a hardware configuration of a processing unit of the biomagnetic field measurement device in FIG. 1.

FIG. 9 is a block diagram illustrating an example of a hardware configuration of the processing unit 4. The processing unit 4 has a CPU (Central Processing Unit) 401, a ROM (Read Only Memory) 402, a RAM (Random Access Memory) 403, an I/O port 404, and an external I/F (Interface) 405. These components are connected to each other communicably via a system bus B. The processing unit 4 may further include a memory such as an HDD (Hard Disk Drive) or an SSD (Solid State Drive).

The CPU 401 executes control processing including various kinds of arithmetic processing. The ROM 402 stores programs used to drive the CPU 401 such as IPL (Initial Program Loader). The RAM 403 is used as a work area for the CPU 401.

The I/O port 404 is an input/output port that connects the irradiation unit 1, the imaging unit 2, the operation unit 5, the display unit 6, and the processing unit 4. The I/O port 404 outputs an irradiation control signal C1 to the irradiation unit 1. The I/O port 404 inputs a captured image Im1 from the imaging unit 2. The I/O port 404 inputs the operation input signal In from the operation unit 5. The I/O port 404 outputs the display control signal Ot to the display unit 6.

The external I/F 405 is an interface for the processing unit 4 to communicate with an external device of the biomagnetic field measurement device 100. The processing unit 4 can communicate with an external server 7 or the like via the external I/F 405.

At least some of the functions implemented by the CPU 401 may be implemented by electric circuitry or an electronic circuit.

(Functional Configuration)

Figure 10:
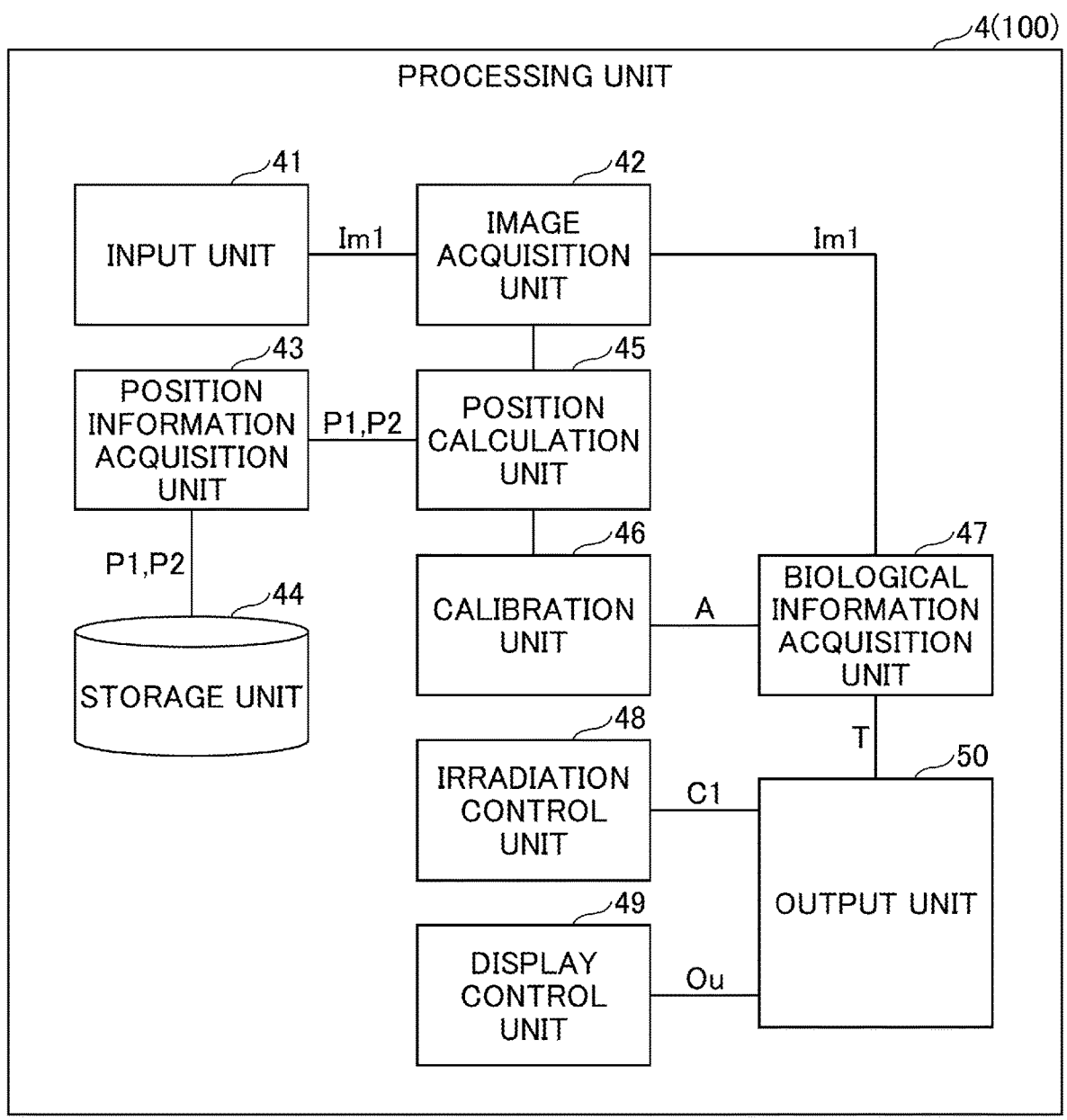
FIG. 10 is a block diagram illustrating an example of a functional configuration of the processing unit according to the first embodiment.

FIG. 10 is a block diagram illustrating an example of a functional configuration of the processing unit 4. The processing unit 4 has an input unit 41, an image acquisition unit 42, a position information acquisition unit 43, a storage unit 44, a position calculation unit 45, a calibration unit 46, a biological information acquisition unit 47, an irradiation control unit 48, a display control unit 49, and an output unit 50.

Each of the functions of the input unit 41 and the output unit 50 is implemented by at least one of the I/O port 404 and the external I/F 405 in FIG. 9. Each of the functions of the image acquisition unit 42, the position information acquisition unit 43, the position calculation unit 45, the calibration unit 46, the biological information acquisition unit 47, the irradiation control unit 48, and the display control unit 49 is implemented by the CPU 401 in FIG. 9 that executes a predetermined program stored in the ROM 402 or the like. The function of the storage unit 44 is implemented by the RAM 403 or the like in FIG. 9.

The image acquisition unit 42 acquires the captured image Im1 captured by the imaging unit 2 via the input unit 41. The image acquisition unit 42 outputs the acquired image Im1 to the position calculation unit 45.

The position information acquisition unit 43 acquires first position information P1, which is information about relative positions of the marker part 31 and the marker part 32 with respect to each other, and second position information P2, which is information about a position of the irradiation unit 1. Each of the first position information P1 and the second position information P2 is information about a position in a coordinate system predetermined in the biomagnetic field measurement device 100. The first position information P1 and the second position information P2 are each measured in advance and stored in the storage unit 44. The position information acquisition unit 43 can acquire the position information by referring to the storage unit 44.

The position calculation unit 45 detects respective positions of the marker part 31 and the marker part 32 included in the captured image ml. The position calculation unit 45 also performs processing to convert the marker part image 31' and the marker part image 32' into a predetermined coordinate system with respect to the detected positions of the marker part image 31' and the marker part image 32'. Furthermore, the position calculation unit 45 causes the storage unit 44 to store information on the position and inclination of the light-receiving surface 20. With these processes, the position and inclination of one point on the light-receiving surface 20 can be used to calculate the value of each pixel on the image in the predetermined coordinate system. Since the marker 31 and the marker 32 are spherical, the center position of the circular marker image 31' can be detected as the position of the marker 31, and the center position of the circular marker image 32' can be detected as the position of the marker 32. The position calculation unit 45 may use the Hough transform to detect the center positions of the circular marker image 31' and the circular marker image 32'. The position calculation unit 45 may also reduce the load of the detection process by extracting the image areas around the circular marker image 31' and the circular marker image 32' as pre-processing before detecting each of the circular marker image 31' and the circular marker image 32'.

The position calculation unit 45 performs projection transformation of the image areas corresponding to the marker part 31 and the marker part 32 on the captured image Im1, using the first position information P1 and the second position information P2. The position calculation unit 45 can calculate respective positions of the marker part 31 and the marker part 32 that are projection-transformed on the light-receiving surface 20 as third position information P3. In other words, the position calculation unit 45 can calculate the third position information P3 from the first position information P1 of the marker part 3, the second position information P2 of the irradiation unit 1, and the image of the marker part 3 captured by the imaging unit 2.

The calibration unit 46 calibrates associated information A between the distance on the image and the distance in the real space by associating the distance on the image of an organ or the like included in the X-ray captured image with the distance in the real space, based on the third position information P3 calculated by the position calculation unit 45.

The biological information acquisition unit 47 acquires biological information T, which is an image associated with a distance in the real space, based on the captured image Im1 and the associated information A calibrated by the calibration unit 46. In other words, the biological information acquisition unit 47 can acquire the biological information T based on the third position information P3 of the marker part and the captured image Im1, which is an imaged result of the subject S by the imaging unit 2. The biological information acquisition unit 47 outputs the biological information T to an external device via the output unit 50.

The irradiation control unit 48 controls an operation of the irradiation unit 1 by outputting an irradiation control signal C1 to the irradiation unit 1 via the output unit 50.

The display control unit 49 controls an operation of the display unit 6 by outputting a display control signal Ot to the display unit 6 via the output unit 50.

Each of the functions of the processing unit 4 can be implemented by one or more processing circuits. Here, the term "processing circuit" as used in this specification means a processor programmed by software to execute each function, such as a processor implemented by an electronic circuit, or devices such as ASICs (Application Specific Integrated Circuits), DSPs (Digital Signal Processors), FPGAs (Field Programmable Gate Arrays), and conventional circuit modules designed to execute each function of the above biomagnetic field measurement device 100.

<Example of Position Calculation Processing By Processing Unit 4>

Figure 11:
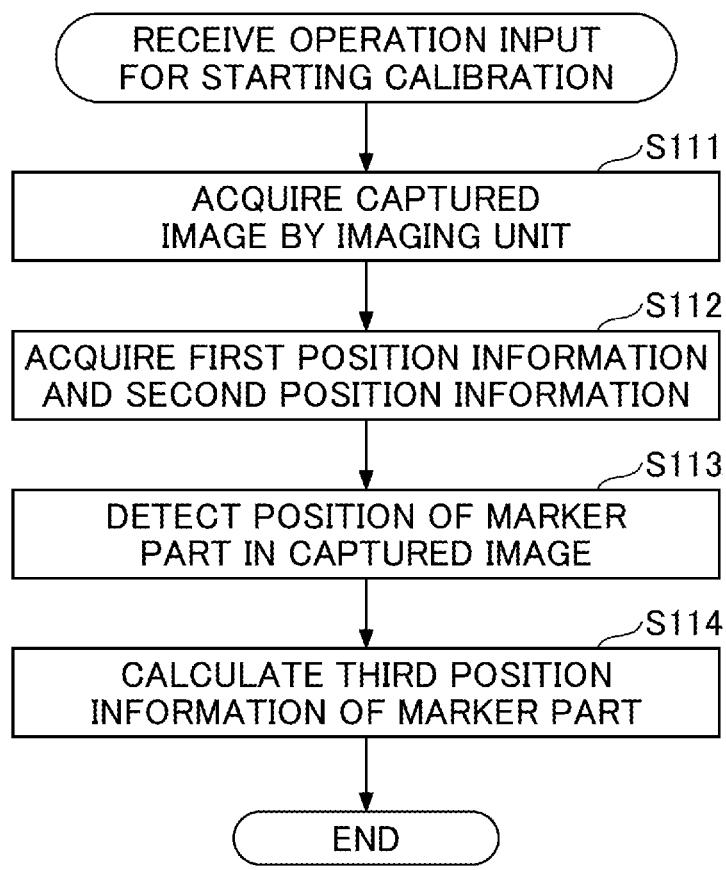
FIG. 11 is a flowchart illustrating an example of position calculation processing by the processing unit according to the first embodiment.

FIG. 11 is a flowchart illustrating an example of position calculation processing by the processing unit 4 according to the first embodiment. The biomagnetic field measurement device 100 measures each of the first position information P1 and the second position information P2 in advance before performing the processing of FIG. 11, and stores the measured first and second position information in the storage unit 44. The biomagnetic field measurement device 100 starts the processing of FIG. 11 when receiving the operation input signal In for starting calibration via the operation unit 5 of FIG. 9, etc.

First, in step S111, the processing unit 4 acquires, by the image acquisition unit 42, the image Im1 captured by the imaging unit 2 via the input unit 41.

Then, in step S112, the processing unit 4 acquires, by the position information acquisition unit 43, the first position information P1 and the second position information P2 with reference to the storage unit 44. The position information acquisition unit 43 also acquires position and inclination information of the light-receiving surface 20. It should be noted that the processing of steps S111 and S112 may be switched, or both may be performed in parallel.

Then, in step S113, the processing unit 4 detects respective positions of the marker part 31 and the marker part 32 included in the image Im1 captured by the position calculation unit 45.

Then, in step S114, the processing unit 4 performs, by the position calculation unit 45, projection transformation of the image areas corresponding to the marker part 31 and the marker part 32 on the image Im1, using the first position information P1 and the second position information P2. The position calculation unit 45 can calculate the respective positions of the marker part 31 and the marker part 32 that are projection-transformed on the light-receiving surface 20 as the third position information P3. The position calculation unit 45 outputs the calculation results to the calibration unit 46.

As described above, the processing unit 4 can calculate the third position information P3 of each of the marker part 31 and the marker part 32.

<Effects of the Biomagnetic Field Measurement Device 100>

As described above, the biomagnetic field measurement device 100 outputs, by the processing unit 4, the biological information T, based on the third position information P3 of the marker part 3 and an image Im1 (an imaged result of the subject S) captured by the imaging unit 2, where the third position information P3 of the marker part 3 is calculated from the first position information P1 of the marker part 3, the second position information P2 of the irradiation unit 1, and an image Im1 of the marker part 3 captured by the imaging unit 2. By using the third position information P3 of the marker part 3, the biomagnetic field measurement device 100 can output the biological information T, which is an image obtained by associating the distance on the image with the distance in the real space.

For example, in order to acquire the third position information P3, when a marker part that transmits information by itself, such as a magnetic marker that generates a magnetic field, is used as the marker part, the information transmitted from the marker part must be received by the imaging unit. However, when the marker part is installed such that the information transmitted from the marker part is received by the imaging unit, the position of the marker part may be restricted. In addition, the marker part that transmits the information itself is expensive because such a marker part needs to be equipped with a driving unit, etc., which increases the cost of the biomagnetic field measurement device.

According to the present embodiment, the third position information P3 is acquired by operation without using the marker part that transmits the information itself. Therefore, the restriction on the position where the marker part is installed can be relaxed. Moreover, the cost of the biomagnetic field measurement device 100 can be prevented from increasing.

In addition to the position information of the irradiation unit 1, the processing unit 4 may calculate the third position information P3 of the marker part 3 based further on the position information of the light-receiving surface 20. That is, the second position information P2 may include the position information of the irradiation unit 1 and the position information of the light-receiving surface 20. The biomagnetic field measurement device 100 can calculate the third position information P3 with high accuracy by further using the position information of the light-receiving surface 20.

The processing unit 4 may calculate the third position information P3 of the marker part 3 based further on the inclination information of the light-receiving surface 20 with respect to the central axis 10 (see FIG. 1) of the radiation emitted from the irradiation unit 1. The biomagnetic field measurement device 100 can calculate the third position information P3 with high accuracy by further using the inclination information of the light-receiving surface 20 with respect to the central axis 10 of the radiation.

Second Embodiment

A biomagnetic field measurement device 100a according to a second embodiment will be described. It should be noted that the same or similar components as those in the first embodiment are denoted by the same symbols, and duplicated descriptions are omitted as appropriate. The same applies to other embodiments described below.

<Configuration Example of a Biomagnetic Field Measurement Device 100a>

Figure 12:
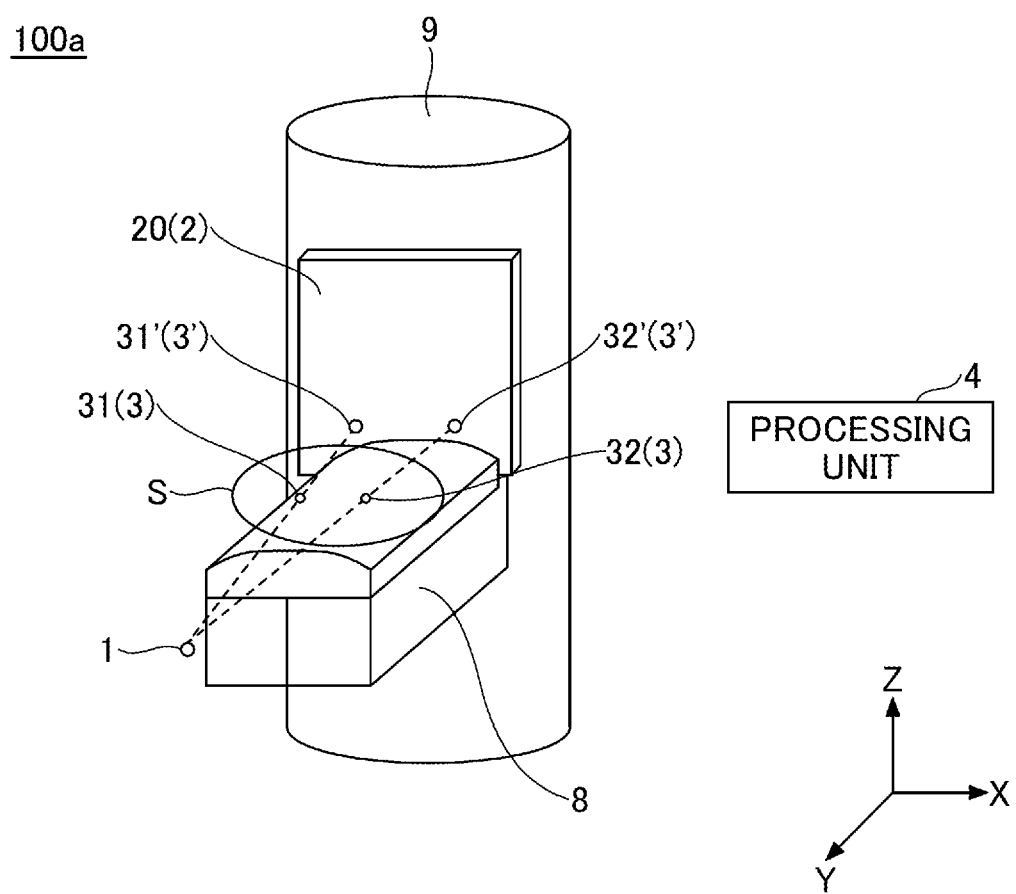
FIG. 12 is a perspective view illustrating an example of a configuration of a biomagnetic field measurement device according to a second embodiment.
Figure 13:
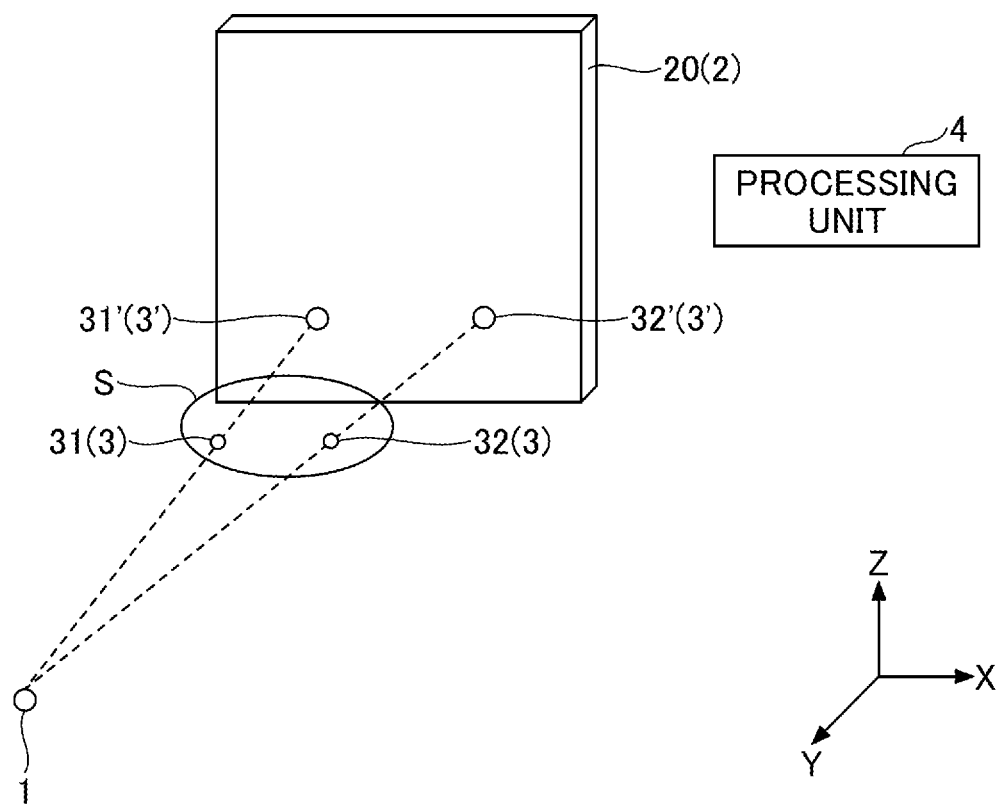
FIG. 13 is a simplified perspective view illustrating the biomagnetic field measurement device of FIG. 12.
Figure 14:
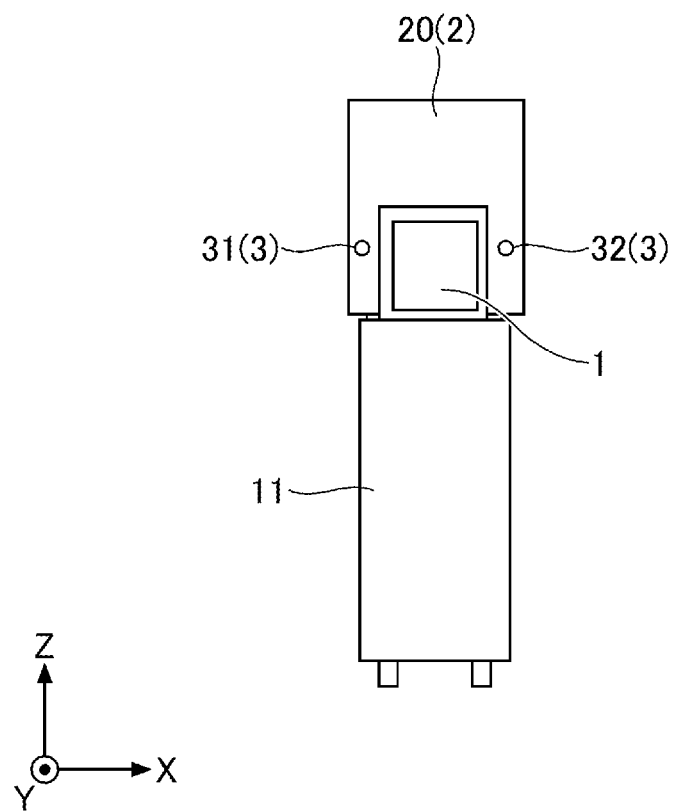
FIG. 14 is a side view illustrating the biomagnetic field measurement device of FIG. 13.
Figure 15:
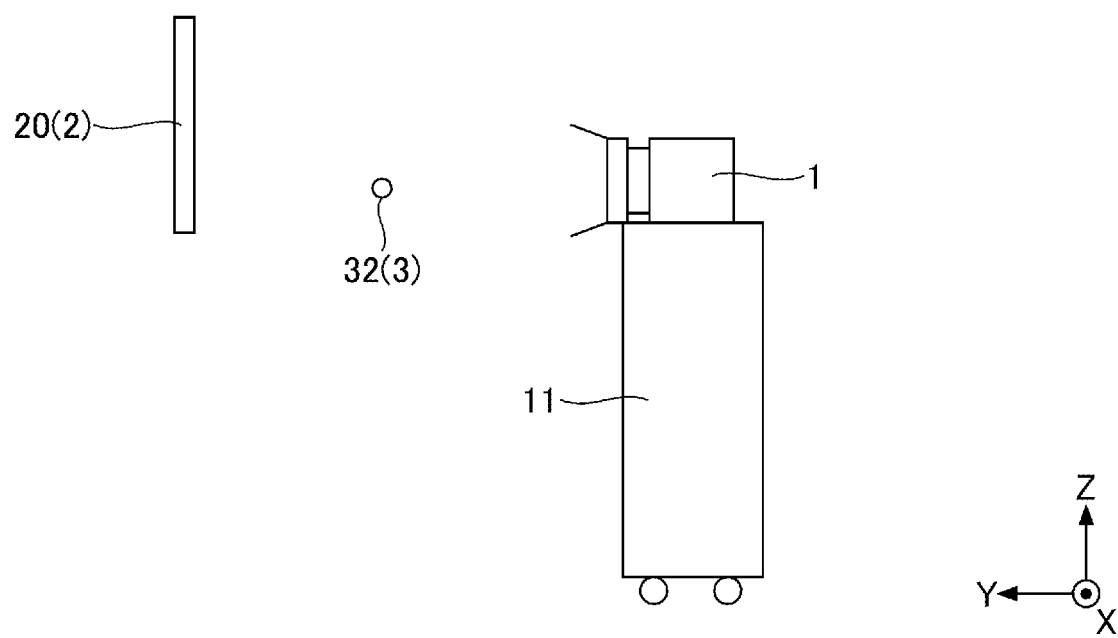
FIG. 15 is a side view illustrating the biomagnetic field measurement device as viewed from a direction perpendicular to FIG. 14.
Figure 16:
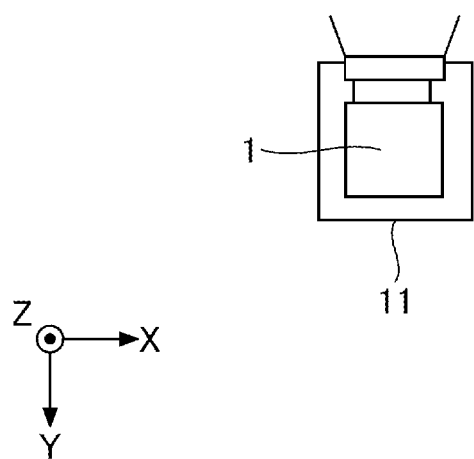
FIG. 16 is a top view illustrating the biomagnetic field measurement device of FIG. 13.

A configuration of the biomagnetic field measurement device 100a will be described with reference to FIGS. 12 to 16. FIG. 12 is a perspective view illustrating a configuration example of the biomagnetic field measurement device 100*a*. FIG. 13 is a simplified perspective view illustrating the biomagnetic field measurement device 100*a*. FIG. 14 is a side view illustrating the biomagnetic field measurement device 100*a* as viewed from the +Y direction. FIG. 15 is a side view illustrating the biomagnetic field measurement device 100*a* as viewed from the +X direction. FIG. 16 is a top view illustrating the biomagnetic field measurement device 100*a*.

As illustrated in FIGS. 12 to 16, the biomagnetic field measurement device 100*a* has a table 8, a support stand 9, and a moving stand 11. On the table 8, a subject S and a marker part 3 including a marker part 31 and a marker part 32 are placed. The marker part 3 is arranged between the table 8 and the subject S. The marker part 3 may be arranged between the subject S and the irradiation unit 1. The support stand 9 supports the light-receiving surface 20. The table 8 is mounted on the moving stand 11 to move the table 8 in the Y-axis direction. Relative positions of the marker part 31 and the marker part 32 are known to each other. A marker part image 31' represents an image of the marker part 31. A marker part image 32' represents an image of the marker part 32.

The irradiation unit 1 irradiates a subject S arranged between the irradiation unit 1 and the imaging unit 2 with radiation. The imaging unit 2 has a light-receiving surface 20 for receiving radiation, and is configured to image the subject S based on the radiation emitted from the irradiation unit 1.

The biomagnetic field measurement device 100*a* irradiates, by the irradiation unit 1, the subject S with radiation laterally with respect to the subject S, and receives the radiation by the light-receiving surface 20 arranged opposite to the irradiation unit 1 across the subject S to image the subject S. The radiation emitted by the irradiation unit 1 is, for example, X-rays. The imaging by the imaging unit 2 is, for example, X-ray imaging. The processing unit 4 outputs an X-ray image of the subject S as biological information based on an imaged result by the imaging unit 2.

Other configurations of the biomagnetic field measurement device 100*a* are the same as those of the biomagnetic field measurement device 100 according to the first embodiment, except for the direction in which the subject S is irradiated, and therefore, the duplicated descriptions are omitted here.

<Modifications of the Marker Part According to the Second Embodiment>

Figure 17:
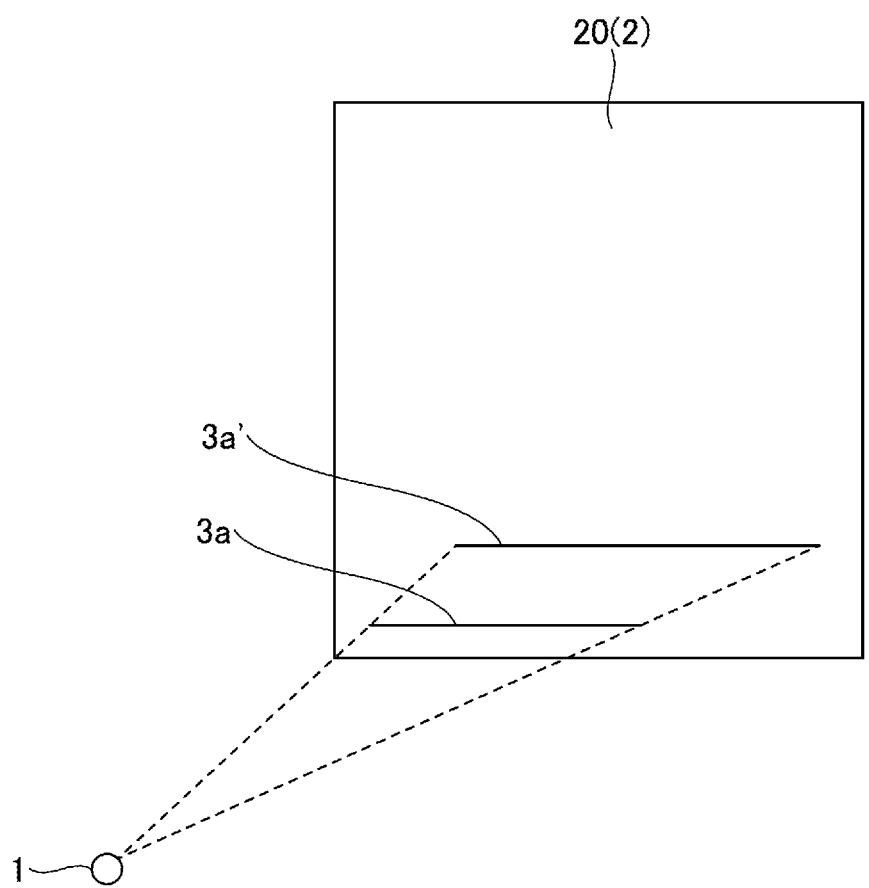
FIG. 17 is a perspective view illustrating a configuration of marker parts according to a first modification of the second embodiment.
Figure 18:
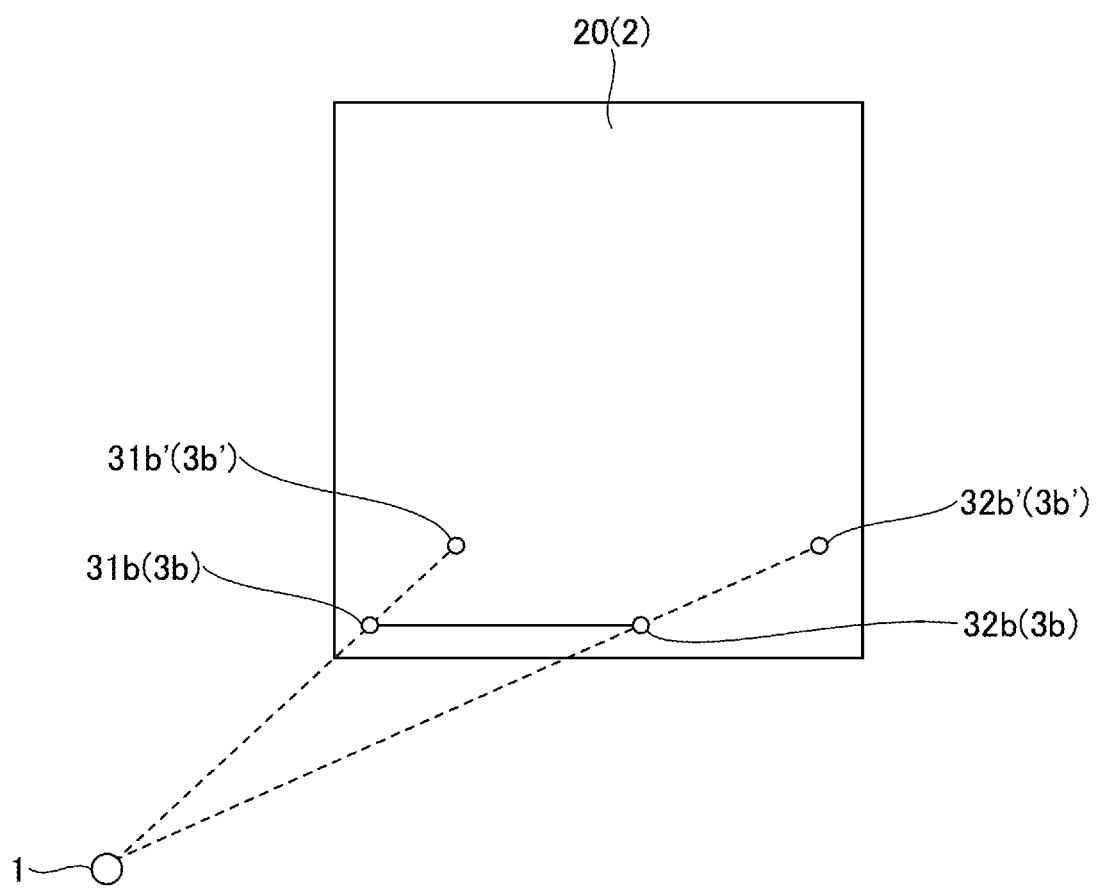
FIG. 18 is a perspective view illustrating a configuration of marker parts according to a second modification of the second embodiment.
Figure 19:
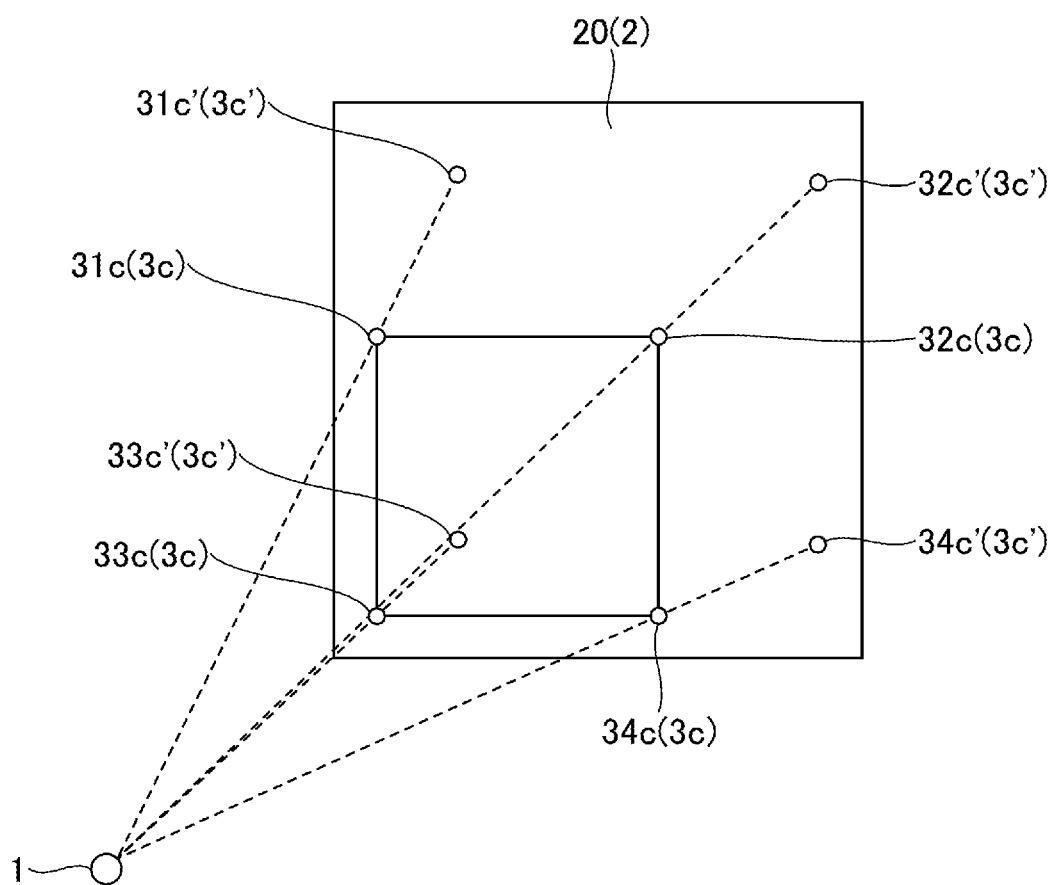
FIG. 19 is a perspective view illustrating the configuration of marker parts according to a third modification of the second embodiment.
Figure 20:
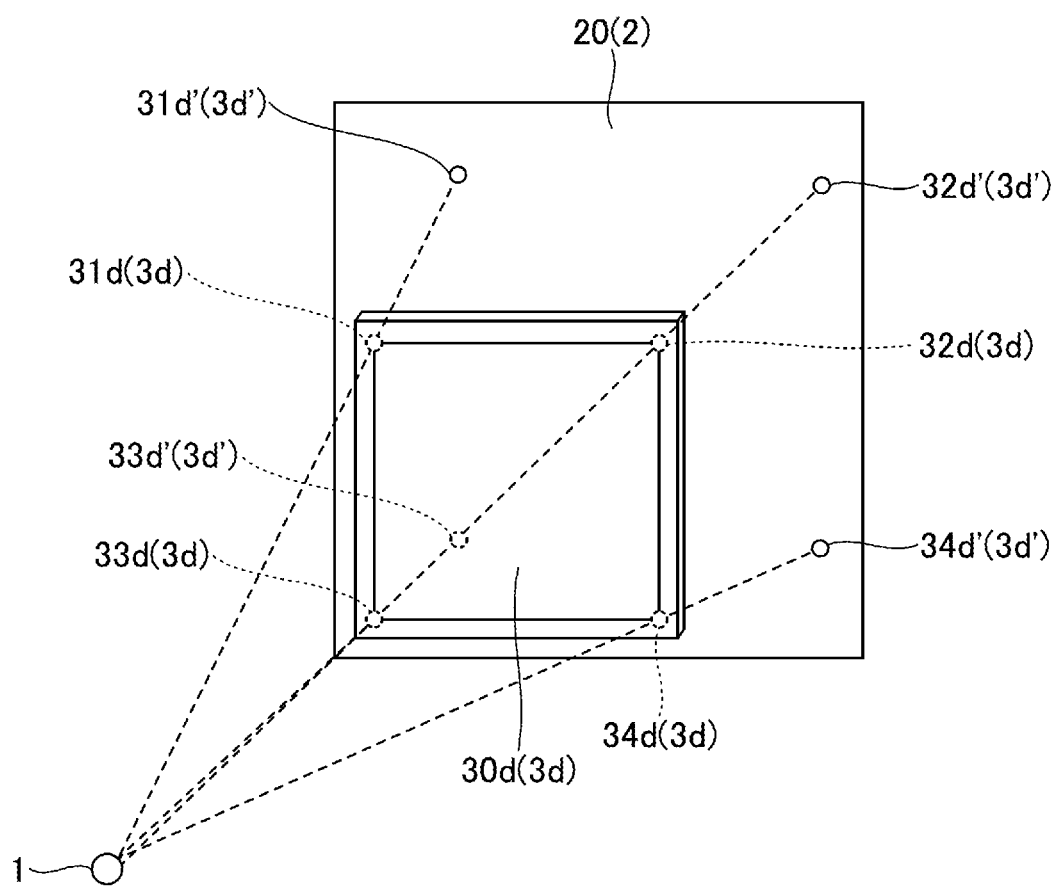
FIG. 20 is a perspective view illustrating the configuration of the marker part according to the fourth modification of the second embodiment.

FIGS. 17 to 20 are perspective views illustrating a configuration of a marker part according to modifications of the second embodiment, where FIG. 17 illustrates a first modification, FIG. 18 illustrates a second modification, FIG. 19 illustrates a third modification, and FIG. 20 illustrates a fourth modification.

FIG. 17 illustrates a marker part 3*a*. The marker part 3*a* differs from the marker part 3*a* illustrated in FIG. 5 only in that the marker part 3*a* in FIG. 17 is mounted laterally relative to the irradiation unit 1, and the other configurations are the same. FIG. 18 illustrates a marker part 3*b*. The marker part 3*b* differs from the marker part 3*b* illustrated in FIG. 6 only in that the marker part 3*b* in FIG. 18 is mounted laterally relative to the irradiation unit 1, and the other configurations are the same. FIG. 19 illustrates a marker part 3*c*. The marker part 3*c* differs from the marker part 3*c* illustrated in FIG. 7 only in that the marker part 3*c* in FIG. 19 is mounted laterally relative to the irradiation unit 1, and the other configurations are the same. FIG. 20 illustrates a marker part 3*d*. The marker part 3*d* differs from the marker part 3*d* illustrated in FIG. 8 only in that the marker part 3*d* in FIG. 20 is mounted laterally relative to the irradiation unit 1, and the other configurations are the same.

<Effects of the Biomagnetic Field Measurement Device 100*a*>

The biomagnetic field measurement device 100*a* described above can also achieve the same effects as in the first embodiment.

Third Embodiment

<Example of a Functional Configuration of a Processing Unit 4*b*>

Figure 21:
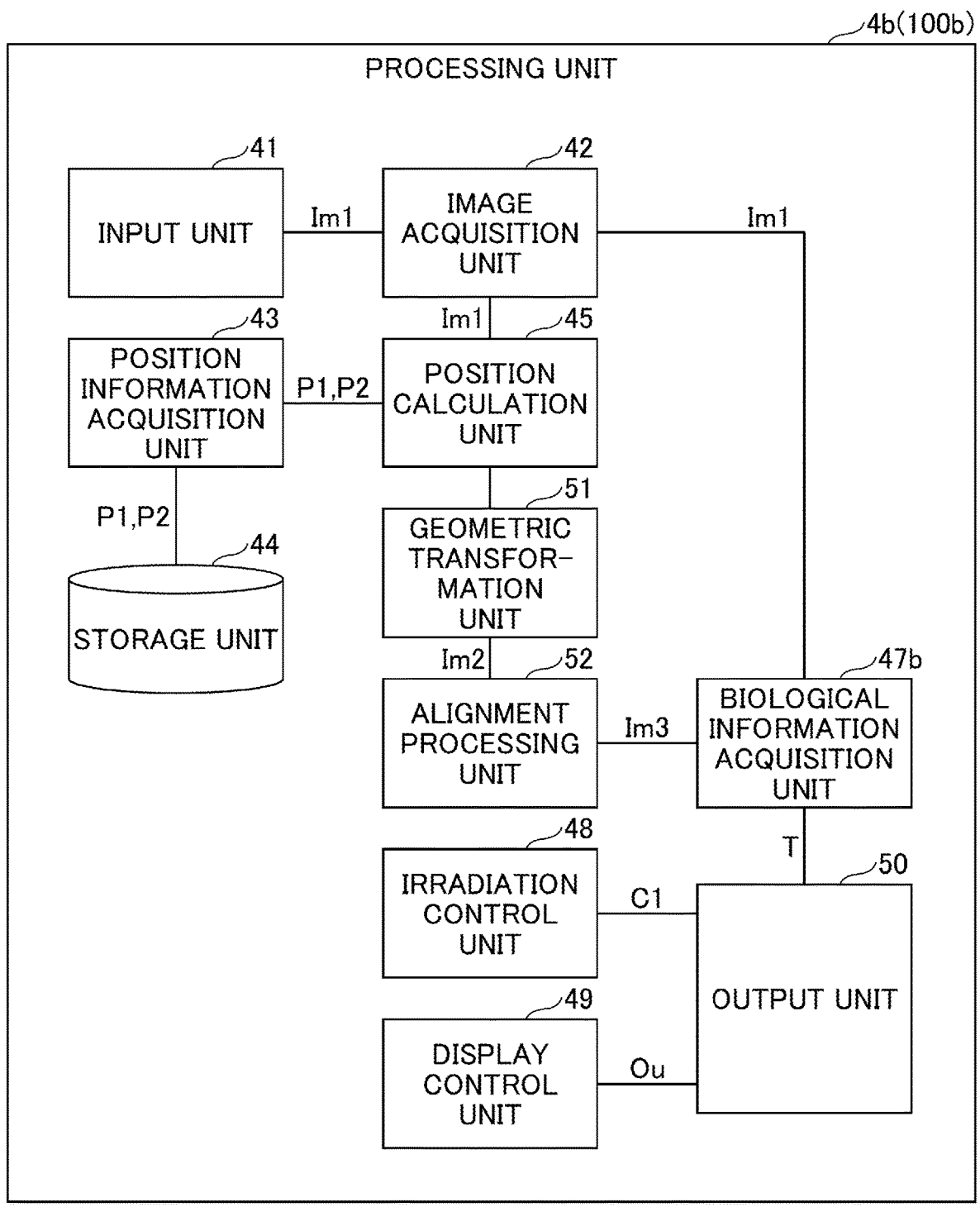
FIG. 21 is a block diagram illustrating an example of a functional configuration of a processing unit according to a third embodiment.

FIG. 21 is a block diagram illustrating an example of a functional configuration of a processing unit 4*b* in a biomagnetic field measurement device 100*b* according to a third embodiment. As illustrated in FIG. 21, the processing unit 4*b* has a geometric transformation unit 51, an alignment processing unit 52, and a biological information acquisition unit 47*b*. Each of the functions of the geometric transformation unit 51, the alignment processing unit 52, and the biological information acquisition unit 47*b* is implemented by, for example, the CPU 401 in FIG. 9 that executes a predetermined program stored in the ROM 402.

The processing unit 4*b* geometrically transforms, by the geometric transformation unit 51, the captured image Im1 to calculate a virtual image Im2, and aligns, by the alignment processing unit 52, the virtual image Im2. Further, the processing unit 4*b* can calculate a virtual image Im2 of each of the multiple captured images Im1, and align each of the calculated multiple virtual images Im2.

The geometric transformation unit 51 geometrically transforms the captured image Im1, using coordinates of the marker part 3 in the predetermined coordinate system and coordinates of the marker part 3 on the captured image Im1 at the position of the light-receiving surface 20. Thus, a virtual image Im2, which is an image at the position of the marker part 3, is obtained. The transformation result by the geometric transformation unit 51 is displayed on the display unit 6 in FIG. 9. However, the transformation result may be stored in the HDD or the like as a data file. Details of the processing by the geometric transformation unit 51 will be described separately with reference to FIG. 23.

The alignment processing unit 52 aligns the virtual image Im2 obtained by the geometric transformation unit 51, and calculates an aligned image Im3 that is an image after the alignment. The alignment processing unit 52 outputs the aligned image Im3 to the biological information acquisition unit 47*b*. Details of the processing by the alignment processing unit 52 will be described separately with reference to FIGS. 24 to 26.

Based on the alignment image Im3, the biological information acquisition unit 47*b* acquires biological information T, which is an image corresponding to the distance in real space. The biological information acquisition unit 47*b* outputs the biological information T to an external device via an output unit 50.

<Example of Processing By the Processing Unit 4*b*>

Figure 22:
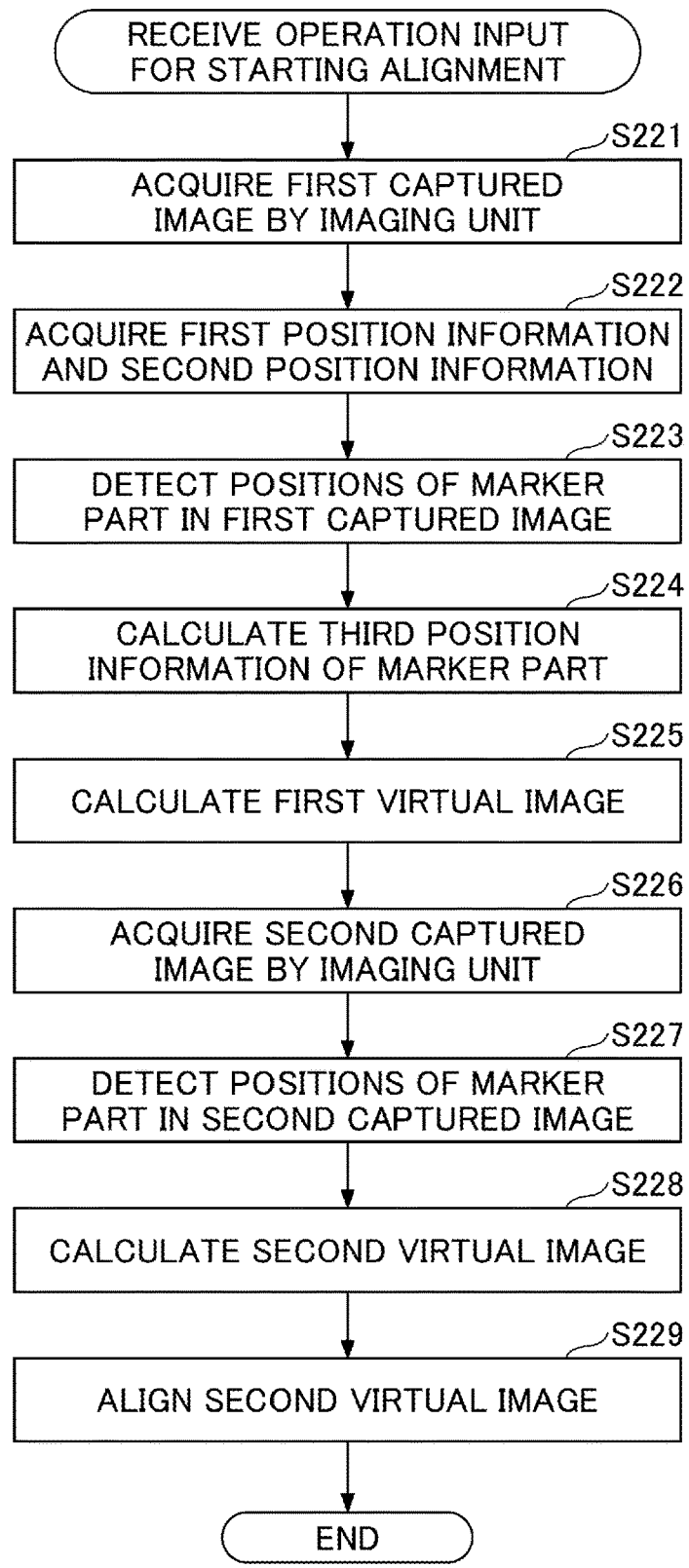
FIG. 22 is a flowchart illustrating an example of alignment processing by the processing unit according to the third embodiment.

FIG. 22 is a flowchart illustrating an example of alignment processing by the processing unit 4*b*. The biomagnetic field measurement device 100*a* measures the first position information P1 and the second position information P2 in advance before performing the processing of FIG. 22, and stores the first position information P1 and the second position information P2 in the storage unit 44. The biomagnetic field measurement device 100 starts the processing of FIG. 22 when receiving the operation input signal In for starting alignment via the operation unit 5 of FIG. 9.

First, in step S221, the processing unit 4b acquires, by the image acquisition unit 42, a first captured image Im11 captured by the imaging unit 2 through the input unit 41.

Then, in step S222, the processing unit 4b acquires, by the position information acquisition unit 43, first position information P1 and second position information P2 with reference to the storage unit 44. It should be noted that the processing of steps S221 and S222 may be switched in order as appropriate, or both steps may be performed in parallel.

Then, in step S223, the processing unit 4b detects the positions of the marker part 31 and the marker part 32 included in the first captured image Im11 by the position calculation unit 45.

Then, in step S224, the processing unit 4b performs, by the position calculation unit 45, projection transformation of the image areas corresponding to the marker part 31 and the marker part 32 on the first captured image Im11, using the first position information P1 and the second position information P2. The position calculation unit 45 can calculate the positions of the marker part 31 and the marker part 32 that are projection-transformed on the light-receiving surface 20 as the third position information P3. The position calculation unit 45 outputs the calculation result to the geometric transformation unit 51.

Then, in step S225, the processing unit 4b performs, by the geometric transformation unit 51, geometric transformation of the first captured image Im11, using coordinates of the marker part 31 and coordinates of the marker part 32 in the predetermined coordinate system, and coordinates of the marker part 31 and coordinates of the marker part 32 in the first captured image Im11 at the position of the light-receiving surface 20. Thus, the first virtual image Im21, which includes the images at the position of the marker part 31 and the marker part 32, is obtained.

Then, in step S226, the processing unit 4b acquires, by the image acquisition unit 42, the second captured image Im12 captured by the imaging unit 2 through the input unit 41.

Then, in step S227, the processing unit 4b detects, by the position calculation unit 45, the positions of the marker part 31 and the marker part 32 included in the second captured image Im12.

Then, in step S228, the processing unit 4b performs, by the geometric transformation part 51, geometric transformation of the second captured image Im12, using the coordinates of the marker part 31 and the coordinates of the marker part 32 in the predetermined coordinate system, and the coordinates of the marker part 31 and the coordinates of the marker part 32 in the second captured image Im12 at the position of the light-receiving surface 20. Thus, the second virtual image Im22, which includes the images at the positions of the marker part 31 and the marker part 32, is obtained.

Then, in step S229, the processing unit 4b performs, by the alignment processing unit 52, the alignment of the second virtual image Im22 obtained by the geometric transformation unit 51, and calculates the aligned image Im3 that is the image after the alignment. The alignment processing unit 52 outputs the aligned image Im3 to the biological information acquisition unit 47b.

Thus, the processing unit 4 can perform alignment processing.

Figure 23:
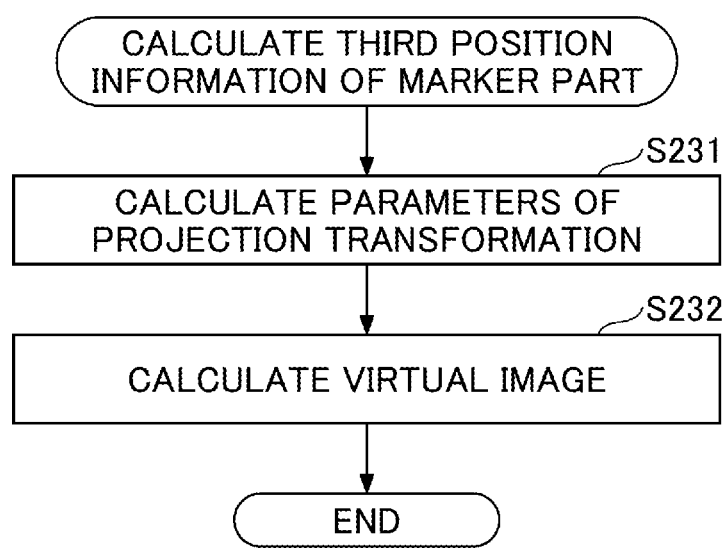
FIG. 23 is a flowchart illustrating an example of geometric transformation processing by the processing unit according to the third embodiment.

Next, FIG. 23 is a flowchart illustrating an example of geometric transformation processing by the processing unit 4b. When the third position information P3 of the marker part 3 is calculated in step S224 of FIG. 22, the processing unit 4b starts the processing of FIG. 23.

First, in step S231, the processing unit 4b calculates parameters of the projection transformation by the geometric transformation unit 51. Here, the position coordinates of the irradiation unit 1 are assumed to be (x0, y0, z0), the position coordinates of the image of the marker part 3 are assumed to be (xb, yb, zb), the position coordinates of the marker part 3 are assumed to be (xa, ya, za), and the relative positions of the four points of the marker part 3 are assumed to be of a square of the length L. The geometric transformation unit 51 calculates parameters (r11, r12, r13, r14, r21, r22, r23, r24, r31, r32, r33, r34) of the projection transformation according to the following equations (1) and (2).

[Equation 1]

$$\frac{x - x_0}{x_b - x_0} = \frac{y - y_0}{y_b - y_0} = \frac{z - z_0}{z_b - z_0} \quad (1)$$

[Equation 2]

$$\begin{bmatrix} x_a \\ y_a \\ z_a \end{bmatrix} = \begin{bmatrix} r_{11} & r_{12} & r_{13} & r_{14} \\ r_{21} & r_{22} & r_{23} & r_{24} \\ r_{31} & r_{32} & r_{33} & r_{34} \end{bmatrix} \begin{bmatrix} 0 & L & L & 0 \\ 0 & 0 & L & L \\ 0 & 0 & 0 & 0 \\ 1 & 1 & 1 & 1 \end{bmatrix} \quad (2)$$

Then, in step S232, the processing unit 4b uses the parameters (r11, r12, r13, r14, r21, r22, r23, r24, r31, r32, r33, r34) of the projection transformation to perform projection transformation on the captured image Im1 by the geometric transformation unit 51. The processing unit 4b calculates the projection transformation result of the captured image Im1 as a virtual image Im2. Here, the captured image Im1 is a generic term for the first captured image Im11 and the second captured image Im12. Here, the virtual image Im2 is a generic term for the first and second virtual images Im21 and Im22.

In this manner, the processing unit 4b can execute the geometric transformation processing.

Figure 24:
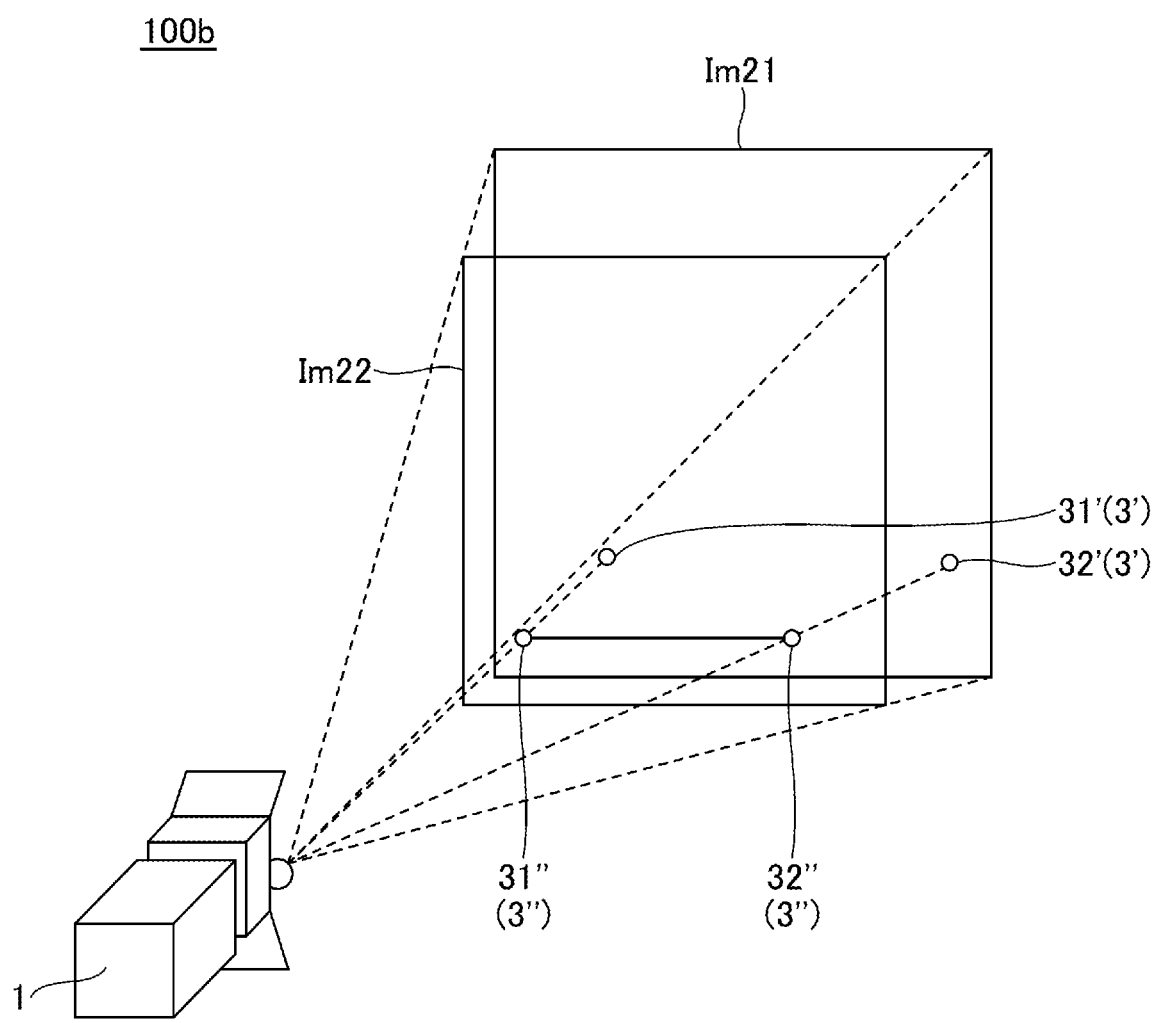
FIG. 24 is a first diagram illustrating an example of alignment processing by the processing unit of FIG. 21.
Figure 25:
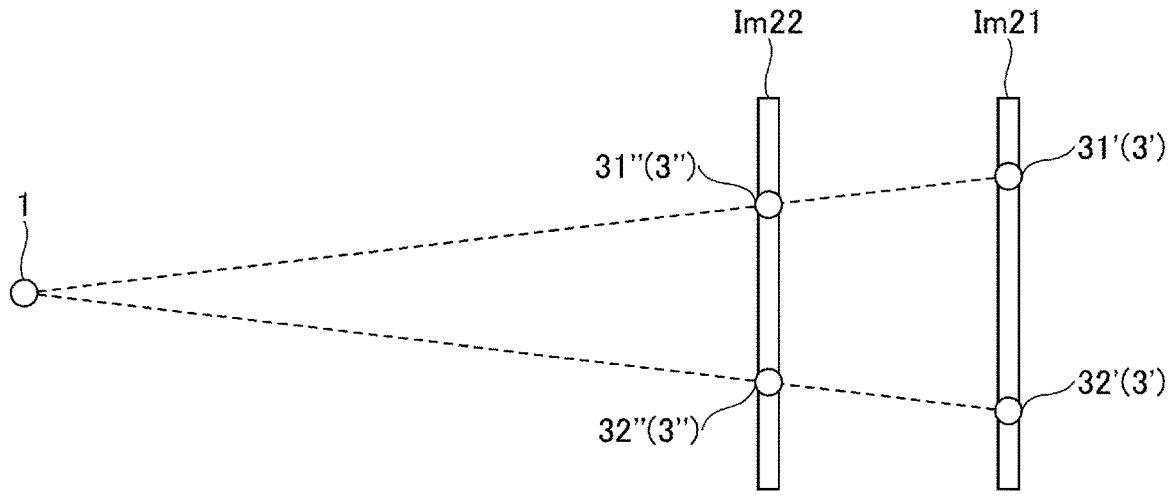
FIG. 25 is a second diagram illustrating an example of alignment processing by the processing unit of FIG. 21.
Figure 26:
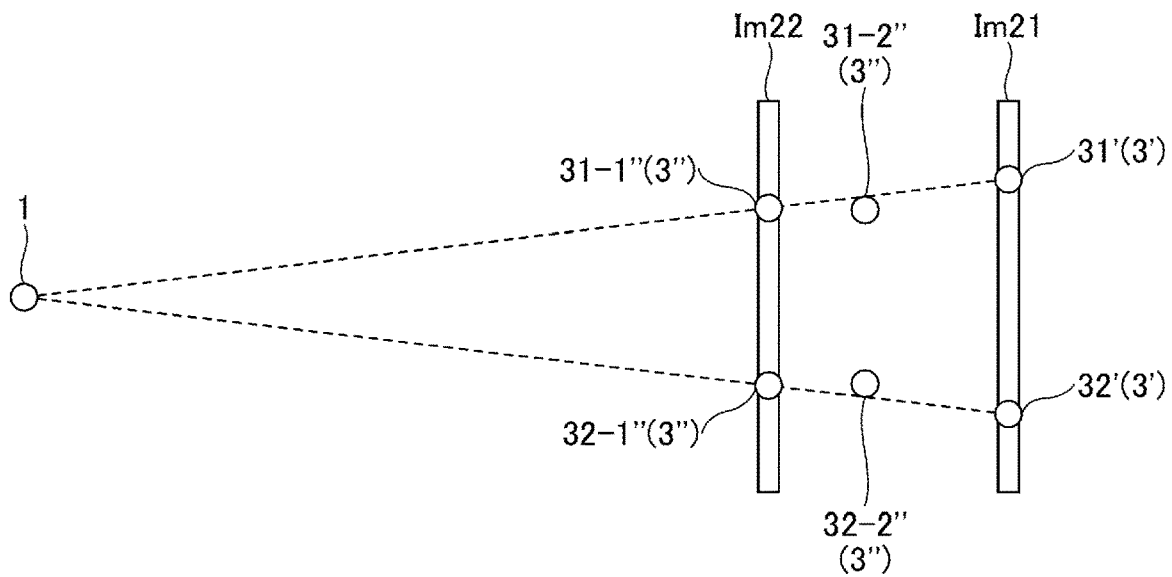
FIG. 26 is a third diagram illustrating an example of alignment processing by the processing unit in FIG. 21.

FIGS. 24 to 26 illustrate an example of the alignment processing of the captured image Im1 and the virtual image Im2 by the processing unit 4b. FIG. 24 is a perspective view, FIG. 25 is a side view with two marker parts 3, and FIG. 26 is a side view with four marker parts 3.

In FIGS. 24 to 26, a marker part image 3' represents an image of the marker part 3 on the light-receiving surface 20. The marker part image 3' is an image in the second captured image Im12. A marker part image 3" represents an image of the marker part 3 at the position of the marker part 3 calculated based on the marker part image 3'. The marker part image 3" is an image in the second virtual image Im22. The marker part image 3' includes a marker part image 31' and a marker part image 32'. The marker part image 3" includes a marker part image 31" and a marker part image 32". In FIG. 26, since there are four marker parts 3, the marker part image 3" includes a marker part image 31-1", a marker part image 31-2", a marker part image 32-1", and a marker part image 32-2".

Planar projection transformation is used to align the second captured image Im12. The alignment processing unit 52 performs planar projection transformation on the second captured image Im12. Thus, the second virtual image Im22, which is an image at the position of the marker part 3, is obtained. Planar projection transformation is a transformation that translates a point (x, y) to a point (u, v). Planar projection transformation can be performed using the following equations (3) through (5). When there are four marker parts 3 and four corresponding points, planar projection transformation to a virtual image can be performed by using transformation parameters (a, b, c, d, e, f, g, h) with the transformation matrix H.

[Equation 3]
$$u = \frac{ax + by + c}{gx + hy + 1} \quad (3)$$

[Equation 4]
$$v = \frac{dx + ey + f}{gx + hy + 1} \quad (4)$$

[Equation 5]
$$H = \begin{pmatrix} a & b & c \\ d & \varepsilon & f \\ g & h & 1 \end{pmatrix} \quad (5)$$

When there are two marker parts 3, d=−b, e=a, and g=h=0; so that the planar projection transformation to the virtual image can be performed by the following equations (6) to (8).

[Equation 6]
$$u = ax - by + c \quad (6)$$

[Equation 7]
$$v = bx + ay + d \quad (7)$$

[Equation 8]
$$H = \begin{pmatrix} a & -b & c \\ b & a & d \\ 0 & 0 & 1 \end{pmatrix} \quad (8)$$

As illustrated in FIG. 25, when there are two marker parts 3, the alignment processing unit 52 performs alignment processing with each position of the two marker parts 3 as a reference. Also, as illustrated in FIG. 26, when there are three or more marker parts 3 and there are four marker parts 3 in one layer, the alignment processing unit 52 performs alignment using the marker part image 31-1" and the marker part image 32-1" in the plane of the second virtual image Im22. On the other hand, when there are three or more marker parts 3 and there are eight marker parts 3 in two layers, the alignment processing unit 52 performs alignment using four marker part images in the plane of the second virtual image Im22.

As described above, the biomagnetic field measurement device 100b can align the virtual image Im2 by performing planar projection transformation on the captured image Im1. Moreover, the biomagnetic field measurement device 100b can calculate the virtual image Im2 of each of the multiple captured images Im1, and align each of the multiple virtual images Im2. As a result of these alignments, the captured images from the multiple directions can be aligned to a predetermined coordinate system. Then, the first captured image Im11 and the second captured image Im12 can be transformed in the predetermined coordinate system. Note that the effects other than those described above are the same as in the first and second embodiments.

Fourth Embodiment

Figure 27:
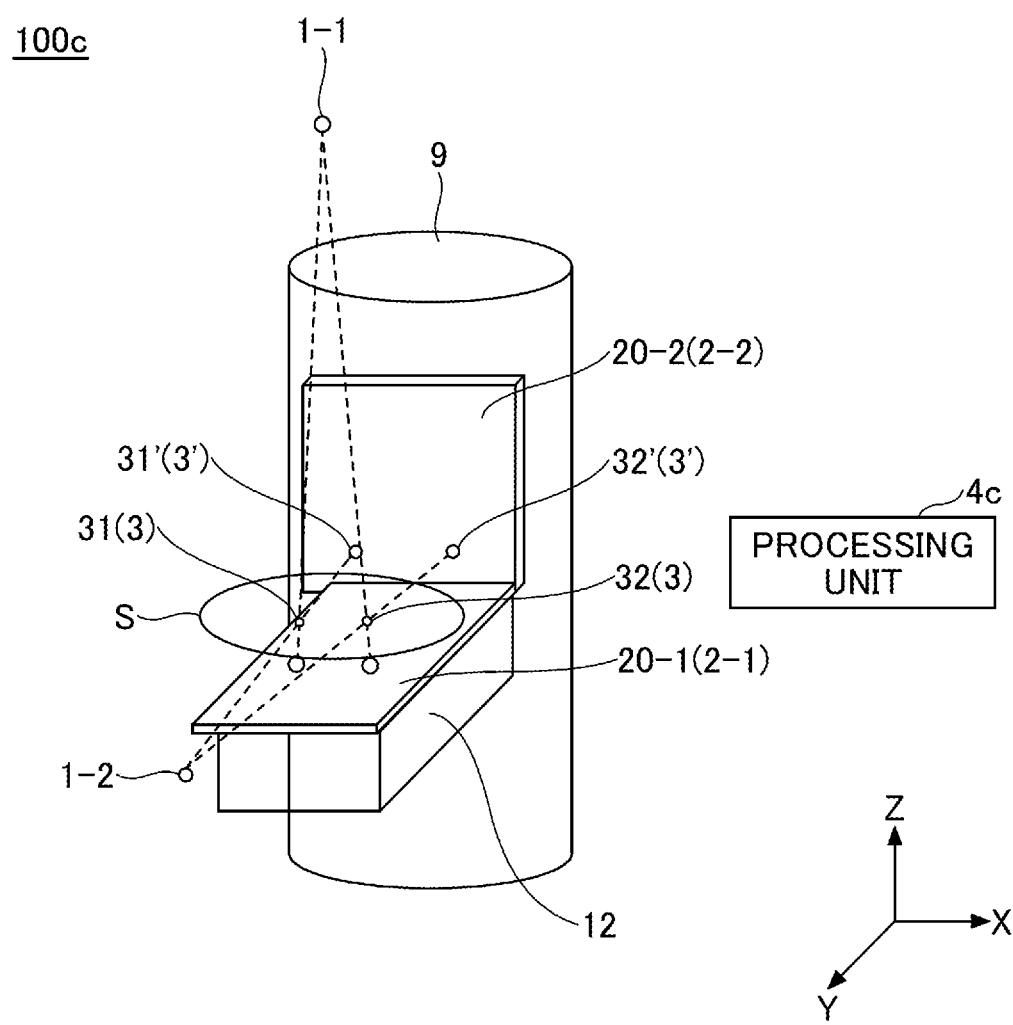
FIG. 27 is a perspective view illustrating an example of a configuration of a biomagnetic field measurement device according to a fourth embodiment.
Figure 28:
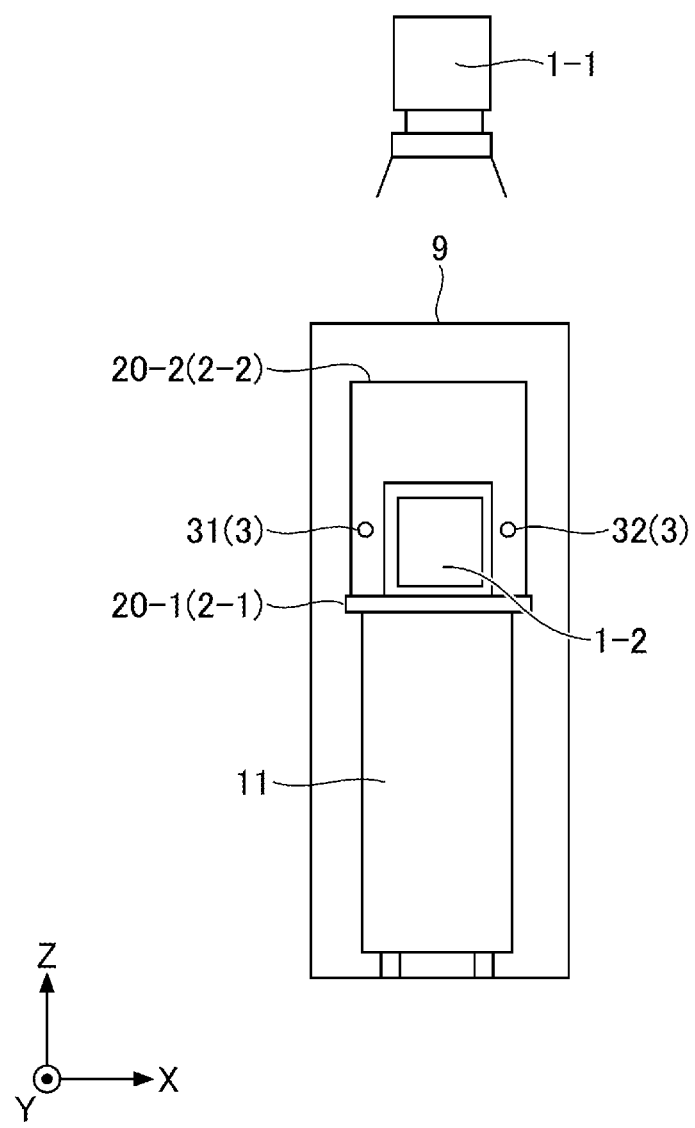
FIG. 28 is a side view illustrating the biomagnetic field measurement device of FIG. 27.
Figure 29:
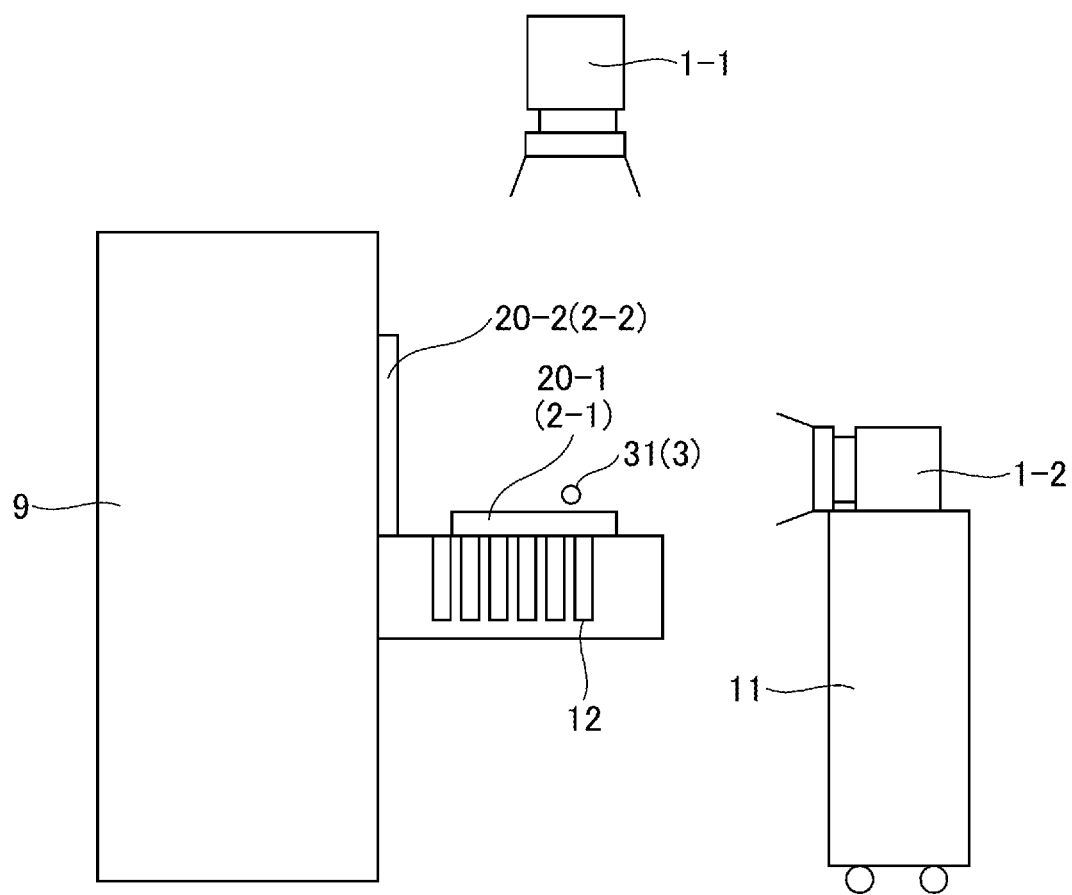
FIG. 29 is a side view illustrating the biomagnetic field measurement device as viewed from a direction perpendicular to FIG. 28.
Figure 30:
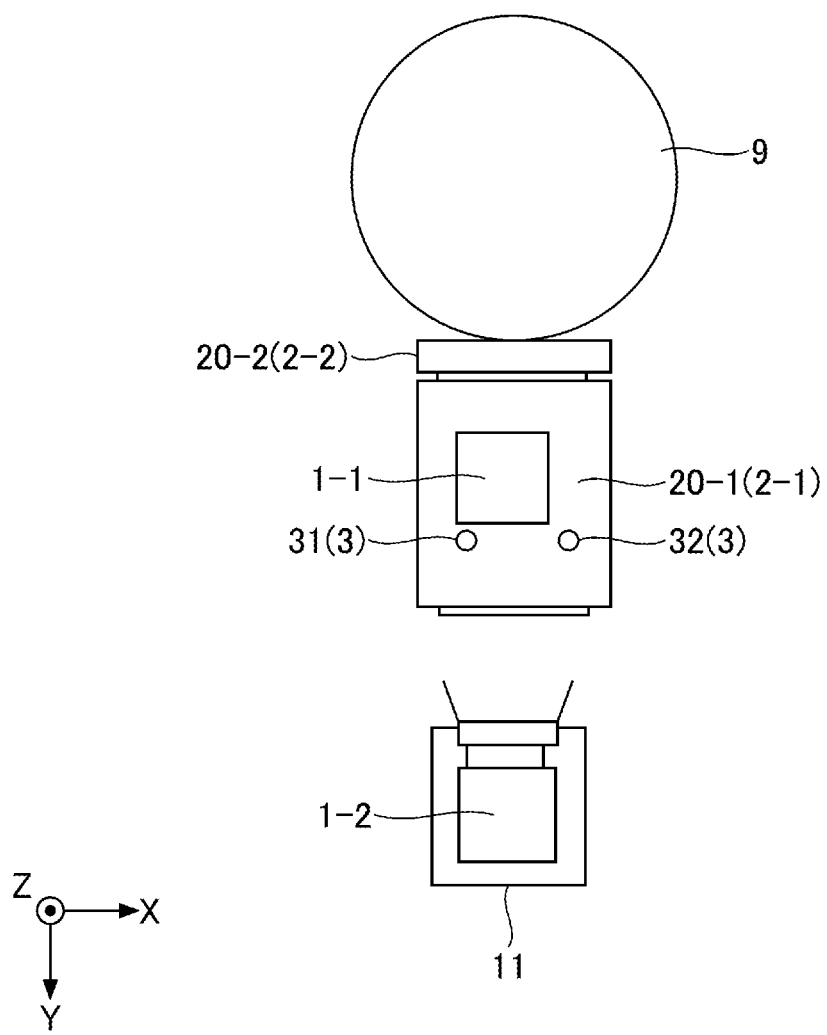
FIG. 30 is a top view illustrating the biomagnetic field measurement device of FIG. 27.

A biomagnetic field measurement device according to a fourth embodiment will be described. FIG. 27 is a perspective view illustrating a configuration example of a biomagnetic field measurement device 100c according to the fourth embodiment. FIG. 28 is a side view illustrating the biomagnetic field measurement device 100c as viewed from the +Y direction. FIG. 29 is a side view illustrating the biomagnetic field measurement device 100c as viewed from the −X direction. FIG. 30 is a top view illustrating the biomagnetic field measurement device 100c.

As illustrated in FIGS. 27 to 30, the biomagnetic field measurement device 100c has a first irradiation unit 1-1, a second irradiation unit 1-2, a first imaging unit 2-1, a second imaging unit 2-2, a detection unit 12, and a processing unit 4c. The first imaging unit 2-1 has a first light-receiving surface 20-1. The second imaging unit 2-2 has a second light-receiving surface 20-2.

The first irradiation unit 1-1 irradiates a subject S with radiation from above. The first imaging unit 2-1 is arranged opposite to the first irradiation unit 1-1 across the subject S, and imaging is performed using radiation from the first irradiation unit 1-1.

The second irradiation unit 1-2 irradiates the subject S with radiation laterally with respect to the subject S. The second imaging unit 2-2 is arranged opposite to the second irradiation unit 1-2 across the subject S, and imaging is performed using the radiation from the second irradiation unit 1-2.

The detection unit 12 detects biomagnetic field of the subject S. The detection unit 12 outputs information about the detected magnetism to the processing unit 4. The detection unit 12 is provided so as to face the subject S from below the subject S.

The detection unit 12 is provided with a three-dimensional coordinate system. Each of the second position information P2 of the first irradiation unit 1-1 and the second position information P2 of the second irradiation unit 1-2 is acquired in advance as three-dimensional position information in the three-dimensional coordinate system configured in the detection unit 12, and stored in the ROM 402 or the like of the processing unit 4.

The detection unit 12 is composed of a magnetic sensor, a sensor container, and the like. Specifically, the detection unit 12 is a SQUID (Superconducting Quantum Interference Device) device, a magnetoresistive element (MR (AMR, GMR, TMR, etc.)), a magnetoimpedance element (MI element), a flux gate sensor, a Hall element, an optical pumping atomic magnetic sensor, or the like. When the detection unit 12 is a SQUID device, a SQUID sensor corresponds to the magnetic sensor.

Multiple magnetic sensors are provided. When the detection unit 12 is a SQUID device, the magnetic sensors are fixed inside a sensor container to achieve a superconducting state. The sensors other than the SQUID sensors need not be kept inside the container, so that the position of each sensor can be moved to make it adhere to the subject.

The sensor container has a magnetic detection surface facing a test site of the subject S. The sensor container is also called a cryostat. The sensor container is preferably a vacuum insulated container and is used to fill the interior with liquid helium and to hold the magnetic sensor at a low temperature to achieve a superconducting state.

The processing unit 4c can calculate the third position information P3 of the marker part 3 based on the captured image of the marker part 3 by the first imaging unit 2-1 and the captured image of the marker part 3 by the second imaging unit 2-2. The coordinate system of the detection unit 12 corresponds to a predetermined coordinate system. The third position information P3 of the marker part 3 is information related to the position of the marker part 3 in the coordinate system of the detection unit 12. The processing unit 4c can also associate the measurement result of biomagnetic field with the morphological position of an organ or the like in the subject S based on the detection result by the detection unit 12 and the third position information P3 of the marker part 3 by the processing unit 4.

The biomagnetic field measurement device 100b detects weak biomagnetic field generated by the weak electrical current accompanying the excitation of the cells constituting the heart, the spinal cord, the peripheral nerves, or the like of the subject S by the detection unit 12. Based on the detection result by the detection unit 12 and the third position information P3 of the marker part 3 by the processing unit 4, the biomagnetic field measurement device 100b can output the measurement result of biomagnetic field in association with the morphological position of the organ or the like in the subject S. Note that the effects other than those described above are the same as in the first and second embodiments.

Although the preferred embodiments have been described in detail above, the present invention is not limited to the above-described embodiments, and various modifications and substitutions can be made to the above-described embodiments without deviating from the scope of claims.

The embodiment also includes a biomagnetic field measurement system having any one of the above described biomagnetic field measurement devices 100 to 100c. In addition to any one of the biomagnetic field measurement devices 100 to 100c, the biomagnetic field measurement system may also have an information processing device such as a PC (Personal Computer), a display device, a storage device, and the like.

According to the present disclosure, it is possible to provide a biomagnetic field measurement device, a biomagnetic field measurement system, and a biomagnetic field measurement method capable of acquiring position information of a marker part that does not transmit information by itself.

Aspects of the Present Disclosure

A description is given of some aspects of the present disclosure.

Aspect 1. A biomagnetic field measurement device including:
an irradiation unit configured to irradiate a subject with radiation;
an imaging unit having a light-receiving surface for receiving radiation, the imaging unit being configured to image the subject based on the radiation from the irradiation unit;
a marker part configured to absorb the radiation from the irradiation unit; and
a processing circuit configured to output biological information based on third position information of the marker part and an imaged result of the subject by the imaging unit, the third position information of the marker part being calculated from first position information of the marker part, second position information of the irradiation unit, and a captured image of the marker part imaged by the imaging unit.

Aspect 2. The biomagnetic field measurement device according to aspect 1, wherein the marker part contains iron.

Aspect 3. The biomagnetic field measurement device according to aspect 1 or 2,
wherein the marker part includes a plurality of marker parts whose positions relative to each other are known, and
wherein the first position information is relative position information of the plurality of marker parts.

Aspect 4. The biomagnetic field measurement device according to any one of aspects 1 to 3, wherein the marker part is a sphere.

Aspect 5. The biomagnetic field measurement device according to any one of aspects 1 to 4, further comprising:
a detection unit configured to detect biomagnetic field of the subject,
wherein the second position information of the irradiation unit is three-dimensional position information in a three-dimensional coordinate system configured in the detection unit.

Aspect 6. The biomagnetic field measurement device according to aspect 3, wherein the plurality of marker parts are aligned in a direction intersecting a normal to the light-receiving surface.

Aspect 7. The biomagnetic field measurement device according to any one of aspects 1 to 6, wherein the processing circuit is configured to calculate the third position information of the marker part, based further on position information of the light-receiving surface.

Aspect 8. The biomagnetic field measurement device according to any one of aspects 1 to 7, wherein the processing circuit is configured to calculate the third position information of the marker part, based further on inclination information of the light-receiving surface with respect to a central axis of the radiation irradiated from the irradiation unit.

Aspect 9. A biomagnetic field measurement system comprising:
the biomagnetic field measurement device according to any one of aspects 1 to 8.

Aspect 10. A biomagnetic field measurement method performed by a biomagnetic field measurement device, the biomagnetic field measurement method including:
irradiating, by an irradiation unit, a subject with radiation;
imaging, by an imaging unit, the subject based on the radiation from the irradiation unit, the imaging unit having a light-receiving surface for receiving the radiation; and
outputting biological information based on third position information of the marker part and an imaged result of the subject by the imaging unit, the third position information of the marker part being calculated from first position information of the marker part, second position information of the irradiation unit, and a captured image of the marker part imaged by the imaging unit.

What is claimed is:

1. A biomagnetic field measurement device comprising:
an irradiation unit configured to irradiate a subject with radiation;
an imaging unit having a light-receiving surface for receiving radiation, the imaging unit being configured to image the subject based on the radiation from the irradiation unit;
a marker part configured to absorb the radiation from the irradiation unit; and
a processing circuit configured to output biological information based on third position information of the marker part and an imaged result of the subject by the imaging unit, the third position information of the marker part being calculated from first position information of the marker part, second position information of the irradiation unit, and a captured image of the marker part imaged by the imaging unit.

2. The biomagnetic field measurement device according to claim 1, wherein the marker part contains iron.

3. The biomagnetic field measurement device according to claim 1,
wherein the marker part includes a plurality of marker parts whose positions relative to each other are known, and
wherein the first position information is relative position information of the plurality of marker parts.

4. The biomagnetic field measurement device according to claim 1, wherein the marker part is a sphere.

5. The biomagnetic field measurement device according to claim 1, further comprising:
a detection unit configured to detect biomagnetic field of the subject,
wherein the second position information of the irradiation unit is three-dimensional position information in a three-dimensional coordinate system configured in the detection unit.

6. The biomagnetic field measurement device according to claim 3, wherein the plurality of marker parts are aligned in a direction intersecting a normal to the light-receiving surface.

7. The biomagnetic field measurement device according to claim 1, wherein the processing circuit is configured to calculate the third position information of the marker part, based further on position information of the light-receiving surface.

8. The biomagnetic field measurement device according to claim 1, wherein the processing circuit is configured to calculate the third position information of the marker part, based further on inclination information of the light-receiving surface with respect to a central axis of the radiation irradiated from the irradiation unit.

9. A biomagnetic field measurement system comprising:
the biomagnetic field measurement device according to claim 1.

10. A biomagnetic field measurement method performed by a biomagnetic field measurement device, the biomagnetic field measurement method comprising:
irradiating, by an irradiation unit, a subject with radiation;
imaging, by an imaging unit, the subject based on the radiation from the irradiation unit, the imaging unit having a light-receiving surface for receiving the radiation; and
outputting biological information based on third position information of the marker part and an imaged result of the subject by the imaging unit, the third position information of the marker part being calculated from first position information of the marker part, second position information of the irradiation unit, and a captured image of the marker part imaged by the imaging unit.

* * * * *